US 8,018,106 B2

(12) United States Patent
Buhler

(10) Patent No.: US 8,018,106 B2
(45) Date of Patent: Sep. 13, 2011

(54) MAGNETIC BEARING DEVICE WITH SIMPLIFIED WIRING

(75) Inventor: Philipp Buhler, Zurich (CH)

(73) Assignee: Mecos Traxler AG, Winterthur (CH)

( * ) Notice: Subject to any disclaimer, the term of this patent is extended or adjusted under 35 U.S.C. 154(b) by 704 days.

(21) Appl. No.: 11/628,898

(22) PCT Filed: May 3, 2005

(86) PCT No.: PCT/CH2005/000248
§ 371 (c)(1),
(2), (4) Date: Dec. 8, 2006

(87) PCT Pub. No.: WO2005/121580
PCT Pub. Date: Dec. 22, 2005

(65) Prior Publication Data
US 2008/0265704 A1    Oct. 30, 2008

(30) Foreign Application Priority Data
Jun. 8, 2004 (EP) ................................. 04405354

(51) Int. Cl.
*H02K 7/09* (2006.01)
*F16C 39/06* (2006.01)
(52) U.S. Cl. ........................ 310/90.5; 310/68 B; 361/144
(58) Field of Classification Search ................. 310/90.5, 310/68 B; 361/143, 144, 152, 154
See application file for complete search history.

(56) References Cited

U.S. PATENT DOCUMENTS

| 3,346,794 A | 10/1967 | Stemmler |
| 3,823,990 A | 7/1974 | Gilinson |
| 3,937,533 A | 2/1976 | Veillette |
| 5,627,421 A | 5/1997 | Miller et al. |
| 5,682,071 A | 10/1997 | Buhler et al. |
| 6,005,316 A | 12/1999 | Harris |

(Continued)

FOREIGN PATENT DOCUMENTS

| DE | 100 19 761 A1 | 12/2000 |
| EP | 836022 A1 * | 4/1998 |
| EP | 1 460 284 A2 | 9/2004 |
| GB | 2 303 412 A | 2/1997 |
| JP | 04-272506 A | 9/1992 |

OTHER PUBLICATIONS

Philip Bühler: "Hochintegrierte Madnetlager-Systeme", Diss. ETH No. 11287, Zurich 1995, pp. 41-47.

(Continued)

*Primary Examiner* — Quyen Leung
*Assistant Examiner* — David W. Scheuermann
(74) *Attorney, Agent, or Firm* — Sughrue Mion, PLLC

(57) ABSTRACT

A magnetic bearing device and a method of operation for such a device are provided. The device comprises a group (410) of electromagnetic actuators (411, 412, 413, 414). Each actuator is electrically connected to an amplifier unit (701). The actuators of a first subgroup are connected to a first common node (608), while the actuators of a second subgroup are connected to a second common node (609). The common nodes (608, 609) are connected either directly or through means like an additional actuator. Preferably the common nodes (608, 609) have no additional electrical connection to the amplifier unit. According to a special embodiment of the invention, each subgroup of actuators consists of only one single actuator and the common node has an electrical connection to the amplifier. Thus the device comprises two actuators in a series configuration connected to an H bridge. The common node may be connected to either of two different voltages. The invention enables simplified wiring without increased load requirements for the wires.

17 Claims, 12 Drawing Sheets

U.S. PATENT DOCUMENTS 6,278,251 B1    8/2001    Schöb
6,297,574 B1    10/2001    Reiter et al.
7,091,641 B2    8/2006    Kawashima et al.
2007/0188966 A1    8/2007    Kawashima

OTHER PUBLICATIONS

Jing Zhang: "Power Amplifier for Active Magnetic Bearing", Diss. ETH No. 11406, Zurich 1995, pp. 51-87.

* cited by examiner

MAGNETIC BEARING DEVICE WITH SIMPLIFIED WIRING

FIELD OF THE INVENTION

The present invention relates to a magnetic bearing device and a method of operation of such a device.

BACKGROUND OF THE INVENTION

In a magnetic bearing device, an object is supported electromagnetically in a contactless manner. One or more degrees of freedom of the object are controlled actively by providing position or displacement sensors, feeding the sensor signals to a controller, deriving control currents or control voltages based on the sensor signals, and applying these currents or voltages to electromagnetic actuators with the aid of power amplifiers. In this way, stable levitation of the object to be supported is achieved.

In an important example, a rotor is suspended in a magnetic bearing device for rotation around a rotor shaft. The long axis of the shaft is designated by z, and two mutually orthogonal directions perpendicular to the shaft axis are designated by x and y. Usually five degrees of freedom (three translational and two rotational degrees of freedom) are controlled. In principle, five sensors and the same number of actuators are sufficient for this purpose. Often, however, a higher number of actuators is employed, usually ten, organized in five pairs.

For control of radial motions (translational and tilting motions in the x and y directions), usually two radial bearing units in an upper and a lower position along the z axis are provided. Often, in each radial bearing unit, two pairs of actuators are present for controlling displacements of a shaft section in the ±x and ±y directions, respectively. Likewise, an axial or thrust bearing unit with one pair of actuators is usually present for controlling displacements in the ±z direction. A bias current may be provided to each actuator for setting the operating point.

Each actuator is usually connected to an individual power amplifier by two wires. The power amplifiers are usually housed in a distinct amplifier unit, which can be well removed from the actuators. For the above example of ten actuators, this results in a total number of twenty wires leading from the amplifier unit to the actuators over a significant distance. This high number of wires makes cables and connectors expensive and may also affect reliability.

Different measures have been suggested in the art for reducing the number of wires.

On one approach, biasing of reluctance type actuators is carried out by permanent magnets instead of providing bias currents. The permanent magnets provide a bias magnetic field. (Ulbrich, H.; Wang, Y.-X.; Bormann, J.: Magnetic Actuator Design for Mechanical Engineering Applications. Proceedings of the 4th International Symposium on Magnetic Bearings, Zürich 1994, pp. 377-382.) Then each pair of actuators in each bearing unit may be connected in series with opposite polarity, in such a way that a current through the actuators causes an increase of the magnetic field in the first actuator and a decrease of the magnetic field in the second actuator in the pair. Thereby the number of required wires between the actuators and the amplifier unit may be reduced.

Another approach for reducing the number of wires is the use of a common return wire for several actuators, typically for the connection to ground. In a system with ten actuators, the number of wires may thus be reduced from twenty to eleven. However, in this approach the load requirements of the common return wire are much higher than for the other wires, and the overall power handling capabilities of the wiring may even be increased compared to traditional wiring.

SUMMARY OF THE INVENTION

It is an object of the present invention to provide a magnetic bearing device with simplified wiring. In particular, it is an object of the present invention to provide a magnetic bearing device in which, for a given number of actuators, cheaper wiring between actuators and power amplifiers can be achieved.

It is a further object of the present invention to provide an improved method of operation of such a magnetic bearing device.

According to a first aspect of the present invention, a magnetic bearing device for supporting an object magnetically is provided. The device comprises an amplifier unit and at least one group of electromagnetic actuators for controlling a number m of degrees of freedom of the object. The number of actuators in said group is at least three, preferably at least four. Each actuator has a first and a second port for feeding a current through the actuator. The first port of each actuator is electrically connected to the amplifier unit. The group of actuators is divided into a first subgroup and a second subgroup of actuators. The second port of each actuator in the first subgroup is connected to a first common node, and the second port of each actuator in the second subgroup is connected to a second common node (common junction, common connection). Each common node is common to all actuators in each subgroup. The first common node and the second common node are electrically connected by a node connection means. The common nodes have no additional electrical connection to the amplifier unit (i.e., no current can flow between the common node and the amplifier unit except through the actuators). Alternatively, one or more additional electrical connections (which may be called common returns) are present between the common nodes and said amplifier unit. Then the amplifier unit comprises means for providing the currents through the actuators in such a way that the sum of the absolute values of all currents through the additional electrical connections is always lower than the sum of the absolute values of the currents through all actuators in the group of actuators, preferably lower than half of the latter sum, more preferably lower than the maximum (over time) of the current through any single one of the actuators Thereby, the additional electrical connection may advantageously be dimensioned for carrying a current which is always (preferably significantly) lower than the sum of the absolute values of the currents through all actuators. Such a design and mode of operation are not possible with the wiring schemes of the prior art.

The present invention is based on the realization that it is in fact possible to operate a magnetic bearing device with a reduced number of wires without the need to provide a return wire capable of carrying an excessive load. If such an additional electrical connection (the common return) is present, this connection is preferably dimensioned for carrying a maximum current corresponding to the maximum current through any one of the actuators in the group of actuators. In this way, the common return may have exactly the same specification as all other wires between amplifier unit and actuators, which makes wiring easier and cheaper. Most preferably, no additional electrical connection at all is present between the common nodes and the amplifier unit.

Generally, the amplifier unit will thus comprise means to ensure that the sign of the sum of (signed) current values through the actuators in the first subgroup is opposite to the sign of the sum of (signed) current values through the actuators in the second subgroup. Thus the total current in the common return is at least partially cancelled.

The term "common node" is to be understood as a concept rather than a physical point to which all actuators in a subgroup are connected. The second ports of a subgroup of actuators are to be understood as being connected to a common node whenever they are connected by a low-ohmic and low-inductance connection, like a common wire, a common conductor on a printed circuit board, or some other conductor.

Preferably, the first and second common nodes are directly connected to each other, i.e., they are connected by a good electric conductor. In this case, conceptually there is only one single common node comprising the first and second common nodes. Alternatively, the node connection means may comprise an additional load, such as a coil, specifically, a bias coil for generating a bias magnetic field, or a further electromagnetic actuator.

Advantageously, the amplifier unit comprises means for controlling the currents through the actuators in such a way that any current flowing through the node connection means flows only in a predetermined direction, i.e., that the sum of currents through each subgroup of actuators flows only in a predetermined direction, where these directions are opposite for the first and the second subgroups. This enables, e.g., efficient biasing. In other words, the amplifier unit is preferably operable to provide a plurality of currents to said group of actuators in a manner that, during operation of said magnetic bearing device, the sum of currents from the amplifier unit through the first subgroup of actuators to the first common node does not change its sign.

In an advantageous embodiment, each actuator of said group of actuators is a reluctance-type actuator. These are the most commonly used type of actuators in magnetic bearing devices.

In one specific embodiment, the first port of each actuator in said first subgroup is connected to the amplifier unit with a first polarity, and the first port of each actuator in the second subgroup is connected to the amplifier unit with a second polarity opposite to the first polarity. In such a case, the direction of the current through each actuator is fixed. This enables a particularly simple design of the amplifier unit, which may then be unipolar, i.e., not capable of changing the direction of the current through each actuator. In other words, the amplifier unit is preferably operable to provide a plurality of currents to said group of actuators in a manner that each current from the amplifier unit to the first port of each actuator in the first subgroup flows always in a first predetermined direction and that each current from the amplifier unit to the first port of each actuator in the second subgroup flows always in a second predetermined direction opposite to the first predetermined direction, possibly apart from small residual currents.

In the context of the present invention, polarity is defined as follows. An actuator is understood to be connected to the amplifier unit with a certain polarity if the connection results in any current flowing through the connection between the amplifier unit and the actuator only in a certain predetermined direction. The first port of an actuator being connected with positive polarity to the amplifier unit therefore means that current will flow from the amplifier through the actuator to the common node in the thus specified direction. Correspondingly, negative polarity means that current will flow from the common node through the actuator to the amplifier unit in the thus specified direction.

The thus defined polarity of the connection of the actuator to the amplifier unit and the common node is independent of the polarity (i.e., direction) of the magnetic field generated by the actuator. The magnetic field direction is determined by choosing whether the first or the second port is connected to the amplifier unit or by the winding direction of the coil in the actuator.

The amplifier unit may advantageously comprise active switching means which are operable to selectively connect each actuator of the first subgroup to a first potential level and to selectively connect each actuator of the second subgroup to a second potential level lower than the first potential level. No other active switching means need to be present. This is one specific embodiment of a unipolar amplifier unit.

The amplifier unit will then advantageously further comprise a plurality of first diodes enabling unidirectional current flow from the second potential level to each first port of each said actuator in the first subgroup, and a plurality of second diodes enabling unidirectional current flow from each first port of each actuator in the second subgroup to the first potential level. No other switching means apart from the above-mentioned active switching means (e.g. transistors) and the diodes need to be present.

A specific example is a magnetic bearing device comprising a bearing unit with two pairs of actuators for generating forces in two different positive and negative directions. Such a group of actuators comprises a first actuator for generating a force in a first direction, a second actuator for generating a force in a second direction opposite to the first direction, a third actuator for generating a force in a third direction different from the first and second direction, and a fourth actuator for generating a force in a fourth direction opposite to the third direction. The first subgroup then advantageously comprises the first and the second actuator, and the second subgroup comprises the third and the fourth actuator. Specifically, this connection scheme enables simple biasing for both subgroups.

Another advantageous arrangement comprises a first subgroup of three actuators, a second subgroup of three actuators, the complete group of actuators thus comprising six actuators. A further advantageous arrangement comprises a first subgroup of four actuators, a second subgroup of four actuators, the complete group of actuators thus comprising eight actuators.

If the group of actuators contains at least one pair of actuators operable for generating forces in opposite directions, it is advantageous if each such pair belongs to the same subgroup. When operating the pair with a predetermined bias current, the sum of the currents through each pair can then be kept at the predetermined value more easily.

Often, a magnetic bearing device of the present invention further comprises a controller and a plurality of sensors for detecting displacements of the object. The sensors are operably connected to the controller for providing sensor signals, and the controller is operably connected to the amplifier unit for providing generalized force signals to the amplifier unit based on the sensor signals.

The inventive method is a method of operation of a magnetic bearing device for supporting an object magnetically. The magnetic bearing device comprises an amplifier unit and at least one group of electromagnetic actuators for controlling a number of degrees of freedom of the object, where the number of actuators in said group is at least three, preferably at least four, each actuator in said group of actuators having a first and a second port for providing a current to said actuator, the first port of each actuator in said group of actuators being connected to said amplifier unit, said group of actuators being divided into a first subgroup and a second subgroup of actuators, the second port of each actuator in the first subgroup being connected to a first common node and the second port of each actuator in the second subgroup being connected to a second common node, said first common node and said second common node being electrically connected by a node connection means. In the method, currents are provided to the actuators in such a way that the sum of the absolute values of all currents through any additional electrical connections between said common nodes and said amplifier unit is zero or always lower than the sum of the absolute values of all currents through all actuators in the group of actuators.

Advantageously, the currents to the actuators are provided in such a way that any current flowing through the node connection means flows only in a predetermined direction. In other words, preferably the sum of currents from the amplifier unit through the first subgroup of actuators to the first common node does not change its sign.

In an advantageous embodiment, the sum of the absolute values of all currents through all actuators in the first subgroup is equal to a predetermined bias value. This bias value can be fixed or variable in time, but will advantageously vary more slowly than the currents in the individual actuators.

In the context of the present invention, the magnetic bearing device generally comprises a number of p groups of actuators with a total of a number of n actuators for controlling a number of m degrees of freedom. The actuators of each subgroup in a group of actuators are connected at a common node. The method of the present invention can then be implemented in an elegant fashion as follows. The method comprises providing a plurality of sensor signals;
deriving a set of m control signals based on said sensor signals; and
deriving, from said control signals, a set of n generalized force values for driving the actuators.

In the most simple case, a generalized force value may be a current value to be provided to an actuator. The step of deriving a set of n generalized force values comprises a number of mathematical steps:

determining a geometry matrix $\underline{\underline{D}}$ whose matrix elements describe the geometric arrangement and physical characteristics of the actuators;
determining a node matrix $\underline{\underline{D}}_N$ whose matrix elements describe the connection of the actuators to said common nodes;
determining a bias matrix $\underline{\underline{D}}_b$ whose matrix elements describe additional boundary conditions;
forming a quadratic, invertible system matrix $\underline{\underline{D}}_t$ from the geometry matrix $\underline{\underline{D}}$, the bias matrix $\underline{\underline{D}}_b$, and the node matrix $\underline{\underline{D}}_N$;
inverting said system matrix $\underline{\underline{D}}_t$ to obtain an inverse system matrix $\underline{\underline{D}}_t^{-1}$.
multiplying said inverse system matrix $\underline{\underline{D}}_t^{-1}$ with a column vector containing the values of said $\overline{m}$ control signals, a number of p additional numbers describing currents out of the common nodes, and a number of (n−m−p) additional numbers belonging to said additional boundary conditions to obtain a column vector with n rows containing said generalized force values.

According to a second aspect of the present invention, a magnetic bearing device for magnetically supporting an object is provided, which comprises an amplifier unit and a first and a second actuator, each actuator having a first and a second port. The second port of the first actuator is connected to the first port of the second actuator. The actuators are thus connected in series and share a common node. The first port of the first actuator, the second port of the second actuator and the common node are connected to the amplifier unit. The amplifier unit is adapted for providing a current to the first port of the first actuator in a first predetermined direction and a current to the second port of the second actuator in a second predetermined direction opposite to the first predetermined direction. A bidirectional current may be provided to the common node. Altogether, this corresponds to a system where each subgroup of actuators comprises only one actuator.

In a preferred embodiment, the actuators are connected in a series configuration between the two outputs of an H-bridge circuit, which in turn is connected between a first and a second potential level (voltage), and the common node is connected to switching means which act to alternatively connect the common node to either the first or the second potential level. In other words, the magnetic bearing device comprises first switching means for selectively connecting the first port of the first actuator to a first potential level, second switching means for connecting the second port of the second actuator to a second potential level lower than the first potential level, third switching means for selectively connecting the first port of the first actuator to the second potential level, fourth switching means for selectively connecting the second port of the second actuator to the first potential level, fifth switching means for selectively connecting the common node to the first potential level, and sixth switching means for selectively connecting the common node to the second potential level.

Each of the first, second, fifth and sixth switching means advantageously comprise an active current switch, preferably a transistor.

Each of the third and fourth switching means advantageously consists of a passive current switch which allows current to flow only in a predetermined direction, preferably a diode. A diode acts to switch between a non-conducting state if the voltage between its anode and its cathode is negative and a conducting state if this voltage is positive and exceeds a device-dependent threshold. Thus, the third switching means preferably consist of a diode whose anode is connected to the second potential level and whose cathode is connected to the first port of the first actuator. Correspondingly, the fourth switching means preferably consist of a diode whose anode is connected to the second port of the second actuator and whose cathode is connected to the first potential level. Such a configuration automatically ensures that currents can only flow in the desired directions.

Alternatively, each of the first and second switching means may comprise a transistor. Since the switching state of a transistor depends on a control voltage (e.g., in the case of a MOSFET, the gate voltage) or control current (e.g., in the case of a bipolar transistor, the basis current), the amplifier unit then comprises means for actively controlling the switching means in a manner that ensures that the currents flow in the desired directions.

A method of operating such a magnetic bearing device comprises the steps of providing a predetermined bias current flowing from the first port of the first actuator to the second port of the second actuator;
determining a displacement of a portion of said object from a desired position; and
providing a control current between the amplifier unit and the common node to generate a force which acts to restore the desired position of the portion of the object.

Preferably, the step of providing a predetermined bias current between the first port of the first actuator and the first port of the second actuator comprises the following steps:

selectively connecting the first port of the first actuator to a first potential level and the second port of the second actuator to a second potential level lower than the first potential level until the predetermined bias current is reached; and recirculating current through the first and second actuators by providing a closed current path.

Preferably, the step of providing a control current between the amplifier unit and the common node comprises the following steps in alternating sequence:

selectively connecting the common node to a first potential level; and selectively connecting the common node to a second potential level lower than the first potential level.

The invention can be applied in any application of magnetic bearing units. Specifically, it is advantageous to provide a turbo-molecular pump with a magnetic bearing unit according to the present invention.

BRIEF DESCRIPTION OF THE DRAWINGS

The invention will be described in more detail in connection with an exemplary embodiment illustrated in the drawings, in which.

DETAILED DESCRIPTION OF THE INVENTION

Figure 1:
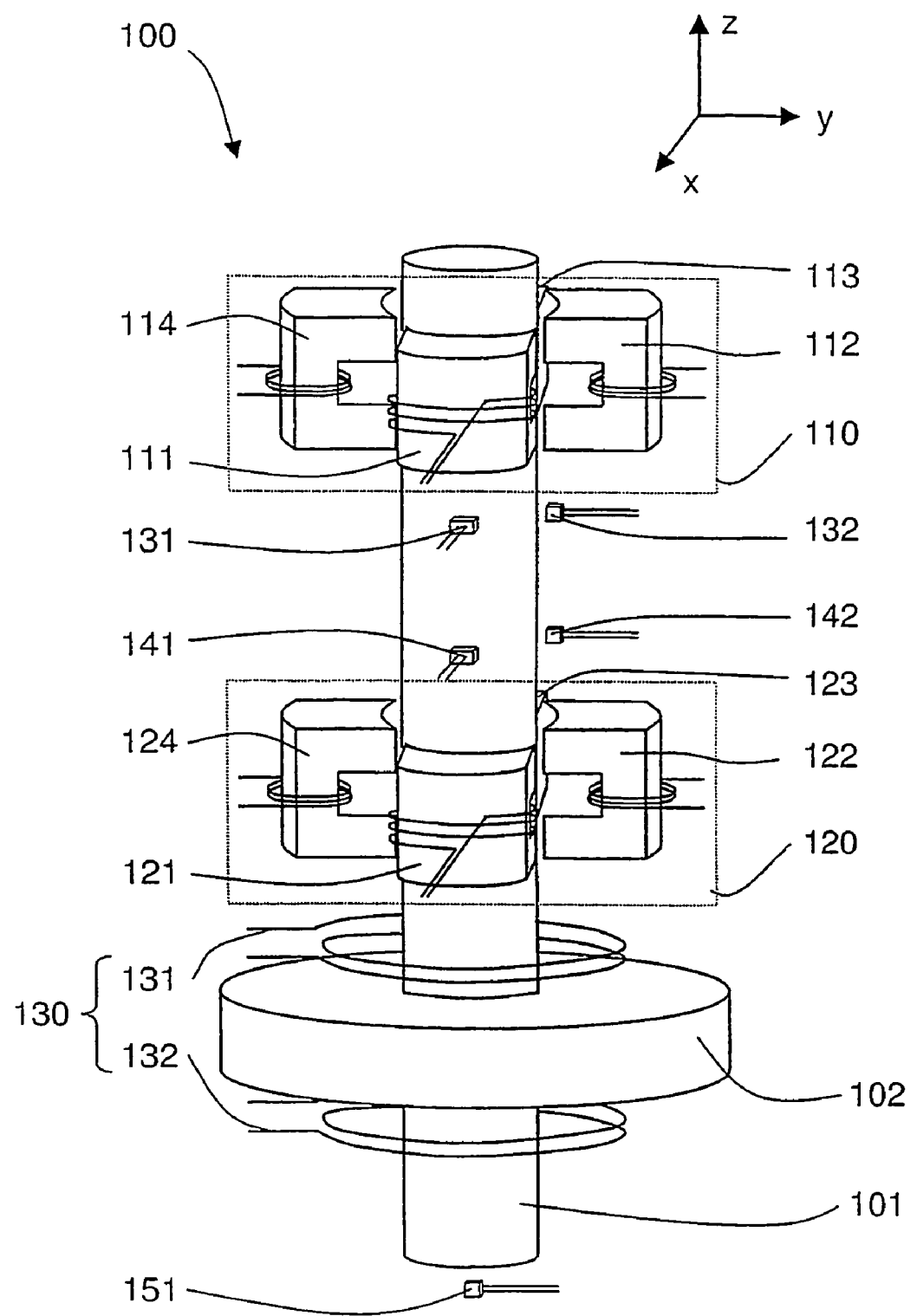
FIG. 1 shows a highly schematic perspective view of a rotor suspended in a magnetic bearing.

FIG. 1 shows, in a highly schematic manner, a rotor shaft 101 suspended in a magnetic bearing device 100 for rotation about the z direction. The bearing device comprises a first (upper) radial bearing unit 110, a second (lower) radial bearing unit 120, and an axial (thrust) bearing unit 130 cooperating with a disk 102 attached to the shaft 101. The upper radial bearing unit 110 comprises four actuators 111, 112, 113, and 114 for exerting forces on an upper region of the shaft 101 in the +x, +y, −x, and −y directions, respectively, the x and y directions being mutually orthogonal and perpendicular to the z direction. Likewise, the lower radial bearing unit 120 comprises four actuators 121, 122, 123, and 124 for exerting forces on a lower region of the shaft 101 in the +x, +y, −x, and −y directions, respectively. Each of the actuators in the radial bearing units consists of an electromagnet comprising a winding on a pole shoe or yoke. Also the axial bearing unit comprises two electromagnetic actuators 131 and 132, symbolized in a simplifying manner just by windings in FIG. 1.

The rotor with shaft 101 suspended in the magnetic bearing device 100 can, to a first approximation, be treated as a rigid rotor with six degrees of freedom (DOFs). One DOF is the rotation about the z axis. This DOF is generally driven by an electromotor which, for simplicity, is not shown in FIG. 1. The other five DOFs can be separated as translations in the x, y and z direction and tilting motions in the x and y directions (in the x-z and y-z planes). These can be controlled as follows: Sensors 131, 132 determine displacements of the upper region of shaft 101 in the ±x and ±y directions, respectively. Likewise, sensors 141, 142 determine displacements of the lower region of the shaft 101 in the ±x and ±y directions, respectively. A sensor 151 determines displacements in the ±z direction. The signals from these sensors are fed to a controller, which derives driving signals (in more general terms, generalized force values) for the actuators from the sensor signals by known means. The same scheme can be generalized to a situation with more than five sensors. Such control schemes are well known in the art. Each driving signal is fed to a power amplifier, which drives an individual actuator by providing the current required to effect a certain force component corresponding to the generalized force value.

Figure 2:
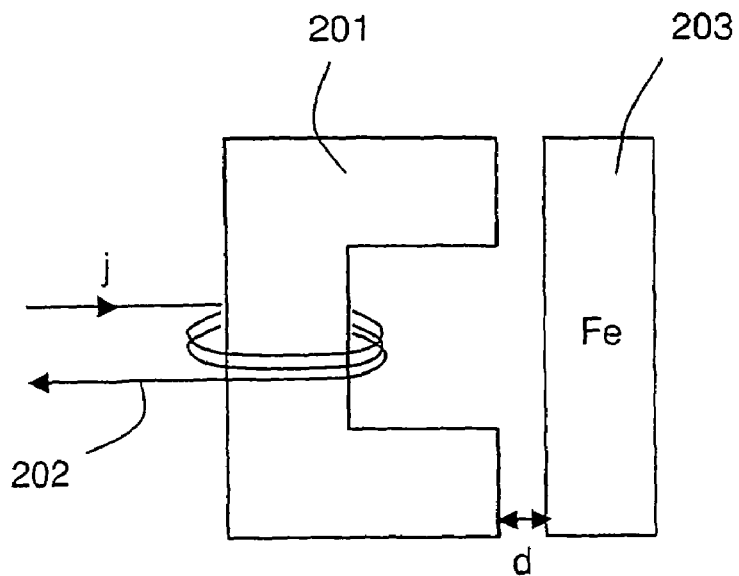
FIG. 2 shows an illustration of the principle of a reluctance-type electromagnetic actuator.

In magnetic bearing devices, often reluctance-type electromagnetic actuators are used. The principle of such an actuator is illustrated in FIG. 2. A current j is provided to a coil 202. This current generates a magnetic flux through a yoke 201 and a ferromagnetic counterpiece 203, e.g., the rotor shaft or a pad on such a shaft, with air gaps with width d between yoke and counterpiece. The flux induces a magnetization in the counterpiece 203. A force F results between the yoke and the counterpiece which is, to a first approximation and neglecting hysteresis, proportional to the square of the current j and inversely proportional to the square of the width d of the air gap: $F \propto j^2/d^2$. The gap is by no means restricted to air. Water gaps, vacuum gaps, $CO_2$ gaps or gaps filled with any other element can also be used. This force is always attractive. Therefore, no repulsive forces can be generated by reluctance-type bearings.

As a consequence, if reluctance-type actuators are used, generally for a given direction (x, y, or z) more than one actuator is needed to achieve full control of displacements in both the positive and negative direction. A further feature of reluctance-type actuators is the approximately quadratic current dependence of the force generated by these actuators. This behavior can be unfavorable, since, in the absence of bias currents, a large current change is required to achieve a given change in force. Therefore, often bias currents are applied to reluctance-type actuators. As a further consequence of the quadratic dependence of the force on the current, the force is independent of the direction of the current through the actuator, and generally only unipolar current sources are required.

An alternative to the use of bias currents is the use of separate means for biasing. Such a bias field can be generated using a permanent magnet or an extra coil:

$$F \propto B^2, \text{where}: B = B_{bias} + B_j \text{ and } B_j \propto j/d.$$

In that case still all forces are attractive. However, in order to achieve zero force, the current must be set negative, and bipolar current sources are required for this purpose.

As an example for how a reluctance-type actuator might be driven, FIG. 3 illustrates, again in a highly schematic manner, a power amplifier 301 connected to a reluctance-type actuator 311 within some bearing unit 310. The power amplifier is of a so-called "H-bridge" design. A first current switch 303 and a first diode 304 are connected in series between a (positive) voltage $V_0$ and ground. The diode is inserted reverse to its conducting direction. In a second branch, a second diode 304' and a second current switch 303' are connected in series, in similar manner, but in opposite order. The actuator 310 is connected to the H-bridge amplifier by two wires leading to the connection points between each diode and each current switch. In electrical terms, the actuator may be represented essentially by a large inductance. In operation, initially both switches are closed, leading to a current j building up in the inductance of the actuator 310. As soon as the required current is reached, one of the switches is opened. Current now flows in a closed loop through the remaining closed switch and one diode. The current can be changed by closing both switches again (increase) or by opening both switches (decrease) and can be detected by a current sensor 305. Each diode can be replaced by an active current switch in order to optimize switching behavior and/or conducting losses. Each active current switch 303 usually comprises a solid-state switching device manufactured from semiconductor material, such as a MOSFET (metal oxide/semiconductor field effect transistor), IGBT (Insulated Gate Bipolar Transistor), a thyristor etc., driven by means of modulation techniques like pulse-width modulation (PWM) in order to control the time-averaged current through each switch. Such devices and driving techniques are well known in the art.

Of course, other types of amplifier designs are possible, and the present invention is by no way limited to the described H-bridge type amplifier design. Other designs which may be applied in connection with the present invention are described, e.g., in (Wassermann, J.; Springer, H: A Linear Power Amplifier with Current Injection for Magnetic Bearings. Proceedings of the 4th International Symposium on Magnetic Bearings, Zürich 1994, pp. 371-376), (Schröder, U: Power Amplifiers for Magnetic Bearings. Proceedings of MAG '96, Magnetic Bearings, Magnetic Drives and Dry Gas Seals, Virginia 1995, pp. 285-301), or (Zhang, J.; Schulze, J. O.; Barletta, N: Synchronous Three-Level PWM Power Amplifier for Active Magnetic Bearings. Proceedings of the 5th International Symposium on Magnetic Bearings, Kanazawa 1996, pp. 277-282).

In the art many other designs of power electronics are known to drive inductive loads. These include current source converters, matrix converters, C-dump converters, resonance converters or linear amplifiers. They are typically used to drive stepping motors, induction motors, reluctance motors, transformers or solenoids.

Figure 3:
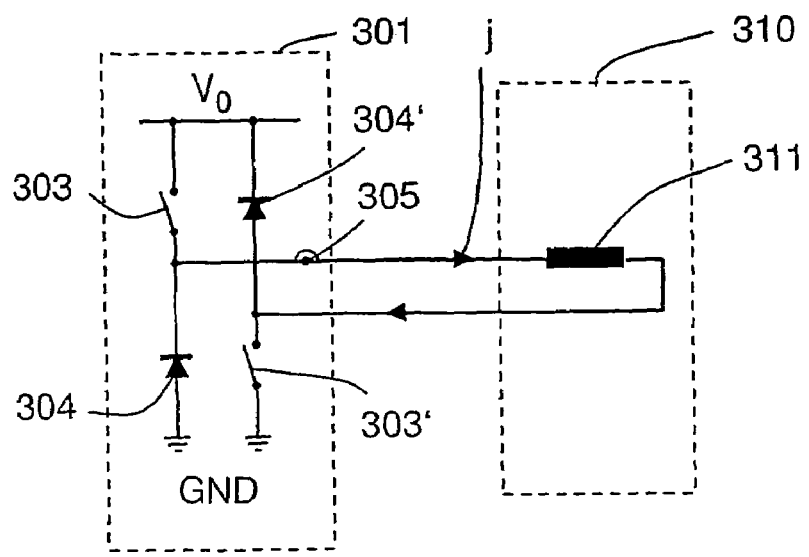
FIG. 3 shows a schematic view of a cabling scheme for connecting an amplifier unit to a single actuator according to the prior art.
Figure 4:
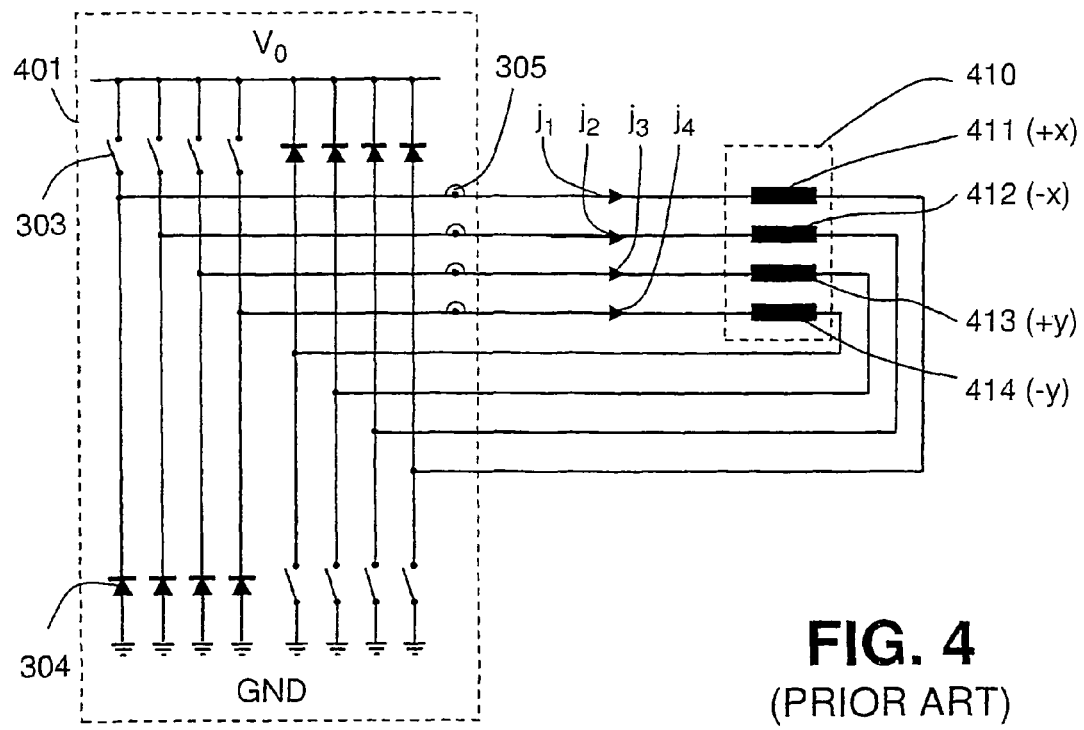
FIG. 4 shows a schematic view of a first cabling scheme of the prior art for connecting an amplifier unit to a bearing unit with four actuators.

With the wiring scheme of FIG. 3, two wires are needed for connecting each actuator to its respective power amplifier. This is illustrated in FIG. 4, which shows, in a highly schematic manner, the wiring of a radial bearing unit 410 comprising four actuators 411, 412, 413, and 414. The actuators are connected to an amplifier unit 401 comprising four individual power amplifiers of the same type as in FIG. 3. For simplicity, it may be assumed that actuator 411 generates forces on a shaft section in the +x direction, actuator 412 in the −x, actuator 413 in the +y and actuator 414 in the −y direction. Eight wires are needed for driving these four actuators. For purposes of comparison, it is useful to compute the required voltage and current rating for each of the wires between the amplifier unit 401 and the bearing unit 410 and for each power switch in the amplifier unit (as well as for each diode). Each actuator carries a current $j_1, j_2, j_3$, and $j_4$, respectively, with a maximum of $j_{max}$. For a voltage $V_0$, each wire as well as each switch must be rated at $V_0$ and $j_{max}$. For the configuration shown, the total power handling capability of the wires is $8 V_0 j_{max}$. The maximum output power of each of the four actuators is $V_0 j_{max}$, and therefore the ratio between power handling requirements of the cables and total output power equals 2.0.

Since there may be a significant distance between the amplifier unit 401 and the bearing unit 410, and since generally connectors are needed at each wire end, wiring will be relatively expensive, and cheaper ways of wiring, requiring less wires, would be desirable.

Figure 5:
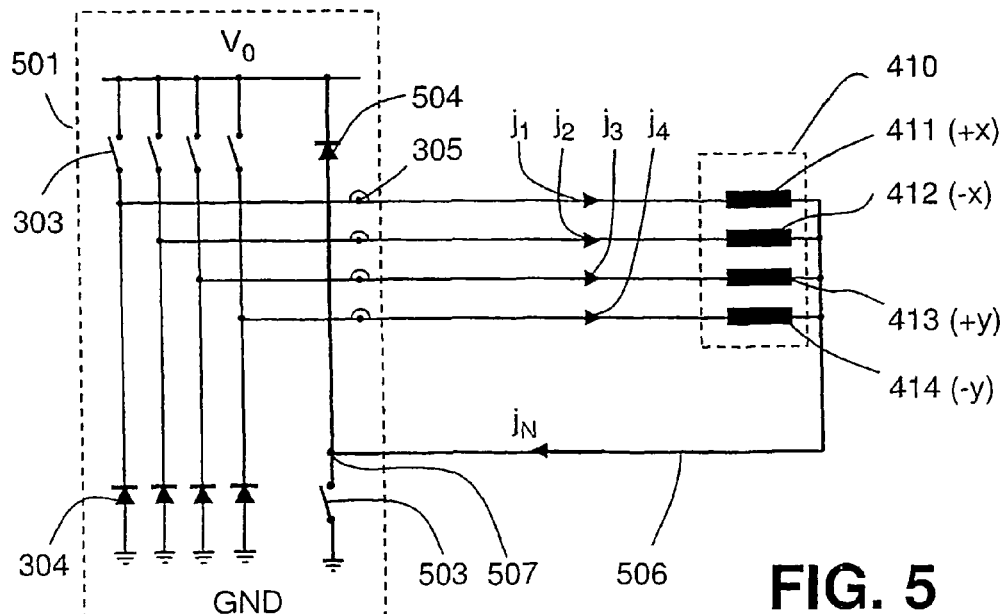
FIG. 5 shows a schematic view of a second cabling scheme of the prior art for connecting an amplifier unit to a bearing unit with four actuators.

It has therefore been suggested in the prior art to provide one single common return wire for all actuators. FIG. 5 shows, in a highly schematic manner, the wiring of the radial bearing unit 410, connected to a different type of amplifier unit 501 adapted to the specific needs of the different wiring. All actuators are now connected by a single return wire 506 to an amplifier branch with switch 503 and diode 504. On first sight, this design seems significantly simpler than the design of FIG. 4, since only five wires are now needed for connecting the bearing unit 410 to the amplifier unit 501. However, it can be seen that the total power handling capabilities of the wires and switches in this design are even increased in comparison to the design of FIG. 4. This can be rationalized as follows: In order to enable independent operation of all four actuators, it is necessary to drive the amplifier in such a way that the potential level at point 507 (at the connection point of the wire 506 to the amplifier unit) is kept on the average at 50% of the maximum voltage $V_0$. Therefore, the maximum average potential difference (voltage) across each actuator is only 50% of the maximum voltage in FIG. 4. For the same maximum $j_{max}$ of the individual currents $j_1, j_2, j_3$ and $j_4$ through the individual actuators, the average output power of each actuator is halved in comparison to FIG. 4 and amounts to only ½ $V_0 j_{max}$. Each of the wires leading to an individual actuator, however, must still be rated at a maximum (peak) voltage of $V_0$ and a current of $j_{max}$, while the common return wire carries a total return current $j_N=j_1+j_2+j_3+j_4$, which may be at a maximum of $4\,j_{max}$ with a maximum (peak) voltage of $V_0$. The same considerations apply for the switches. Altogether, the ratio of power handling capabilities of cables and switches to output power amounts to 4.0. This number may be reduced by implementing a suitable control scheme which limits the momentary sum of the currents through the actuators at each point in time. However, in any case the common return must be dimensioned stronger than the other connections, which complicates the design of both the wiring and the amplifiers.

In summary, the design in FIG. 5 represents a conceptual simplification in the wiring, albeit at the cost of more expensive wires.

Figure 6:
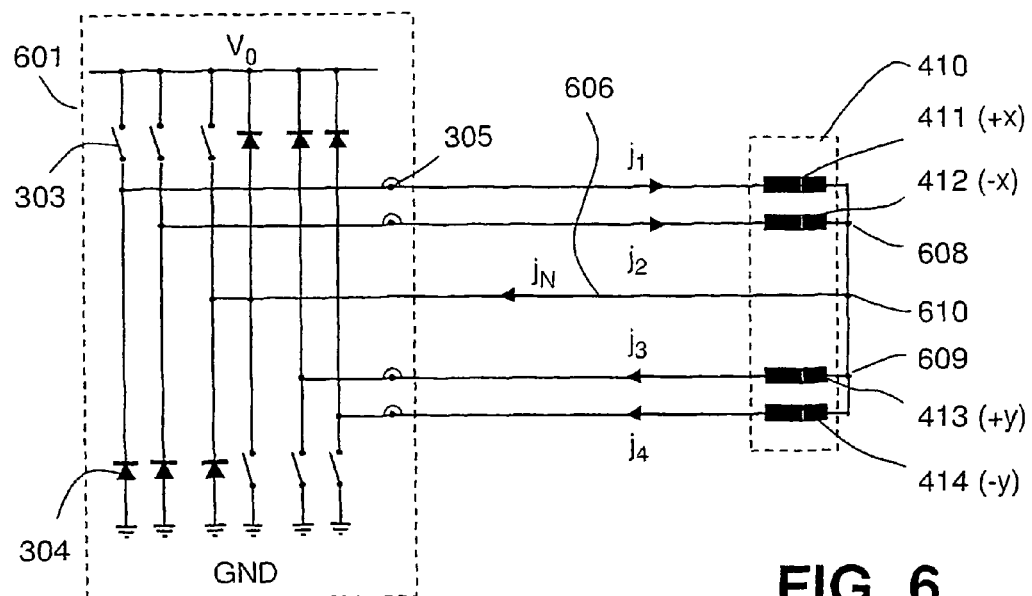
FIG. 6 shows a schematic view of a cabling scheme according to a first embodiment of the present invention, for connecting an amplifier unit to a bearing unit with four actuators.

In contrast, the present invention enables a simplified wiring without requiring increased power handling capabilities of the wires. FIG. 6 shows, in a highly schematic manner, the wiring of the radial bearing unit 410 according to a first embodiment of the present invention and connected to an adapted amplifier unit 601. Two actuators 411 and 412 form a first subgroup, in which each actuator is connected with one port to a first common node 608. Likewise, the other two actuators form a second subgroup, in which each actuator is connected with one port to a second common node 609. Both common nodes 608 and 609 are directly connected, i.e., conceptually these two common nodes can also be viewed as forming one single common node 610. This node 610 is connected to the amplifier unit 601 by a single common return wire 606. In contrast to FIG. 5, however, the two actuators 413 and 414, forming the second subgroup, are connected to the amplifier with opposite polarity than the other two actuators 411 and 412, forming the first subgroup. This does not influence the functionality of the actuators, since the port which is connected to the amplifier unit and the port which is connected to the common node can still be freely chosen for each actuator, in such a way that the current direction through the actuator coils is the same as it would be in FIG. 5. This wiring enables, however, to drive the actuators in a way that the current $j_N$ through the common return wire 606 is minimized. In any event, the current $j_N$ will always be lower than the sum of the absolute values of the currents through all actuators in the unit 410. Therefore, the load requirements of the common return wire 606 are reduced in comparison to the common return wire 506 of FIG. 5. In fact, the return current $j_N$ can be ensured to be not higher than the maximum current through any one of the actuators in the group of actuators, and the return wire may be dimensioned accordingly for fulfilling the same requirements as any other wire between an actuator and the amplifier unit 401. The return current $j_N$ may even be kept at zero permanently. For the configuration of FIG. 6, this can be rationalized as follows: In the absence of control currents, a bias current $j_B$ flows through each actuator. In order to achieve control, a (different) control current $\Delta j_i$ is added to the bias current of each actuator i, thus: $j_i=j_B+\Delta j_i$ (i=1, ..., 4). In order to control displacements along the x-axis, it is sufficient to increase the current $j_1$ in actuator 411 by the same amount as the current $j_2$ in actuator 412 is decreased, and vice versa: $\Delta j_2=-\Delta j_1$. Therefore, the sum of currents $j_1$ and $j_2$ can be kept at a predetermined value, at twice the bias current $j_B$ of each actuator: $j_1+j_2=(j_B+\Delta j_1)+(j_B+\Delta j_2)=2j_B$. The same is true for the currents $j_3$ and $j_4$ through actuators 413 and 414: $j_3+j_4=(j_B+\Delta j_3)+(j_B+\Delta j_4)=2j_B$. Since the polarity of these two actuators in the second subgroup is opposite to the polarity of actuators 411 and 412 in the first subgroup, the sum of the absolute values of currents flowing into node 608 is equal to the sum of the absolute values of currents flowing out of node 609 and equal to twice the bias current: $j_1+j_2=j_3+j_4=2j_B$.

This result can be achieved without any loss in the quality or freedom of control. The reason for this is that four currents are provided for controlling only two degrees of freedom. Therefore, only two conditions for the values of the currents are needed for achieving control. Two more conditions can be freely chosen. The first condition is that a bias current is provided. This bias current does not need to be constant. It can be dynamically adaptable to the actual system status. By the way of example, the bias current can be chosen in such a way that the smallest current is always zero (or some other fixed value). As another example, the bias current may adapted dynamically in such a way that power losses are minimized.

The second condition is that the sum of currents flowing into node 608 is the same as the current flowing out of node 609, i.e., no current flows through the common return ($j_N=0$). In the present example, the latter condition can be fulfilled because the polarity of two actuators is opposite to the polarity of the other actuators, where polarity is defined as above. If all actuators had the same polarity, a zero total current at the common node point would only be possible if all currents were identically zero. This is exactly the situation of FIG. 5, where no operation would be possible if the current through wire 506 were to be kept at zero.

Figure 7:
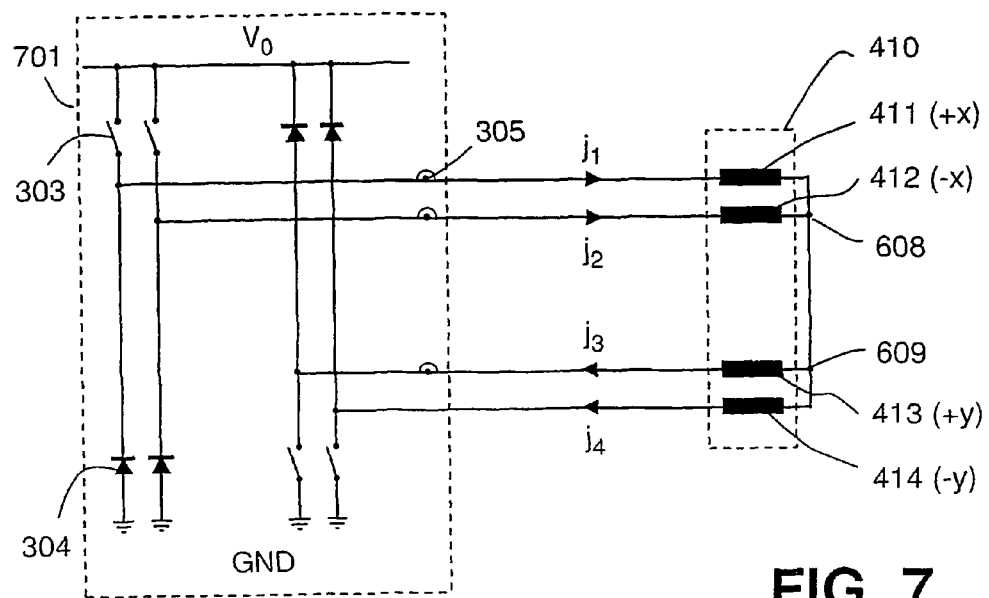
FIG. 7 shows a schematic view of a cabling scheme according to a second embodiment of the present invention, for connecting an amplifier unit to a bearing unit with four actuators.

Since in FIG. 6 the bearing unit 410 can be driven in such a way that no current flows through the common return wire 606, this wire can be left away entirely. This is illustrated in FIG. 7, which shows the same bearing unit 410 as in FIG. 6, but without any additional connection between the common node 610 and the amplifier unit 701, i.e., without a common return wire. Also the amplifier unit 701 is now simplified, since no control circuitry for setting the common potential of the common node 610 is needed any more. Furthermore, the inventive design requires only three current sensors 305, since with knowledge of three currents, the fourth can be readily calculated.

Again, it is instructive to compute the required power handling capabilities of the wires in the arrangements of FIG. 7. It can be seen that, on the average, nodes 608 and 609 will be at a potential of $V_0/2$. Any of the currents $j_1$ to $j_4$ may be at a maximum of $j_{max}$. The maximum power of each actuator is $\frac{1}{2}V_0 j_{max}$, while each wire and switch must be rated at $V_0$ and $j_{max}$. The ratio of total power handling capabilities of wires and switches to actuator output power thus is 2.0, the same as for the prior-art wiring scheme of FIG. 4.

It is thus apparent that a magnetic bearing device according to the present invention has a number of useful properties, which are independent of the specific embodiment of FIG. 7:

The number of wires between amplifier units and bearing units is reduced in comparison to the prior art, enabling a simplified wiring.

The number of switches for driving a given number of actuators is reduced in comparison to the prior art, enabling a simplified amplifier design.

The total current and voltage requirements of wires and switches are not increased in comparison to the prior art.

Taken together, simplified wiring and simplified amplifier design are achieved without the cost of more expensive wires and/or driving circuitry.

Instead of reducing the number of wires and amplifier switches for a given number of actuators, the invention may naturally also be used to increase the number of actuators for a given number of wires and amplifier switches. In this way, redundancy in control can be achieved, e.g., for correcting malfunctions or miscalibrations of the actuators or amplifier components.

Figure 8:
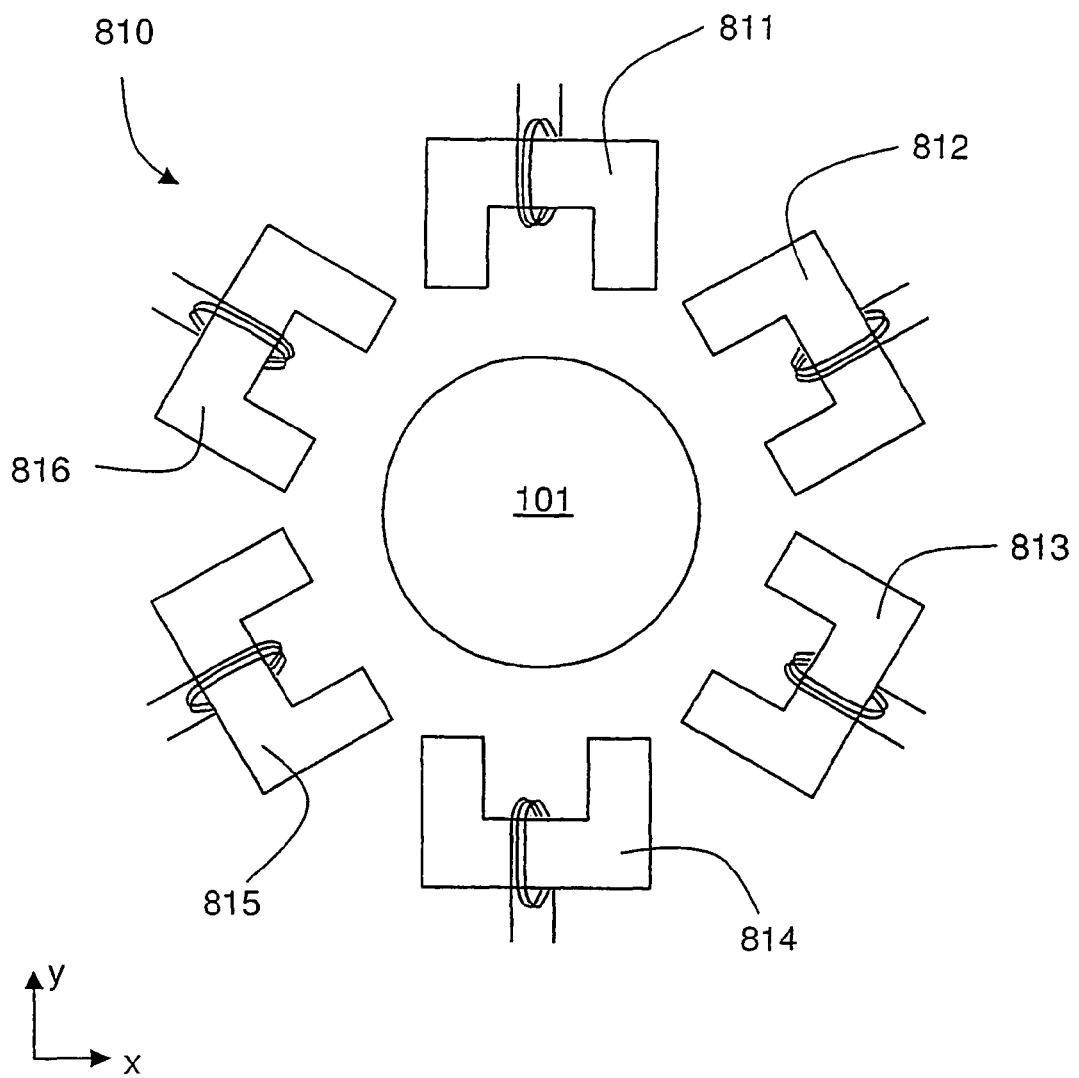
FIG. 8 shows a highly schematic top view of a magnetic bearing unit with six actuators.
Figure 9:
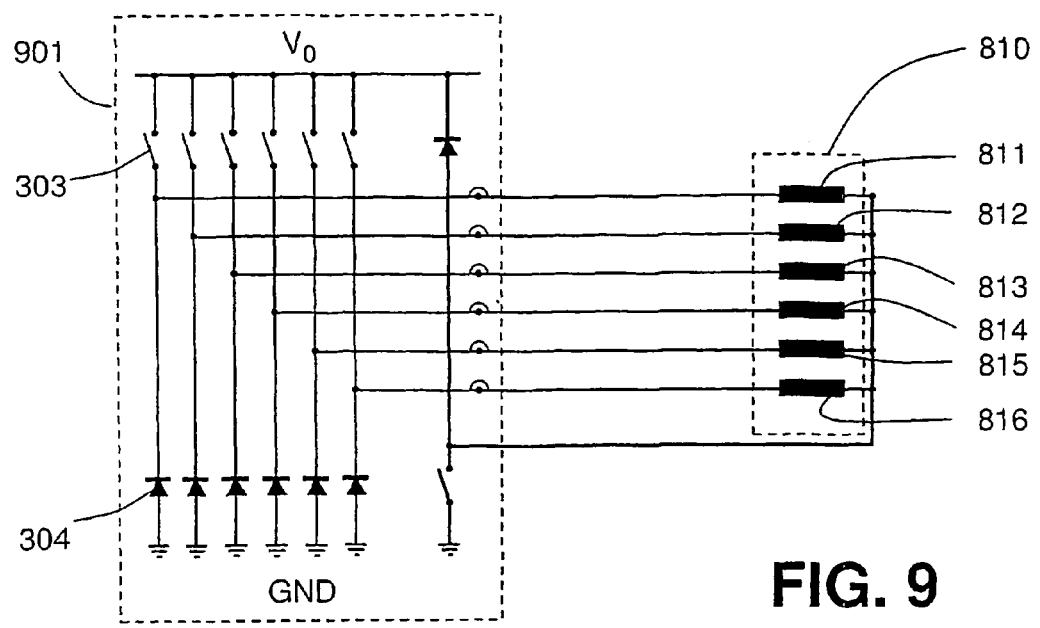
FIG. 9 shows a schematic view of a cabling scheme of the prior art for connecting an amplifier unit to a bearing unit with six actuators.
Figure 10:
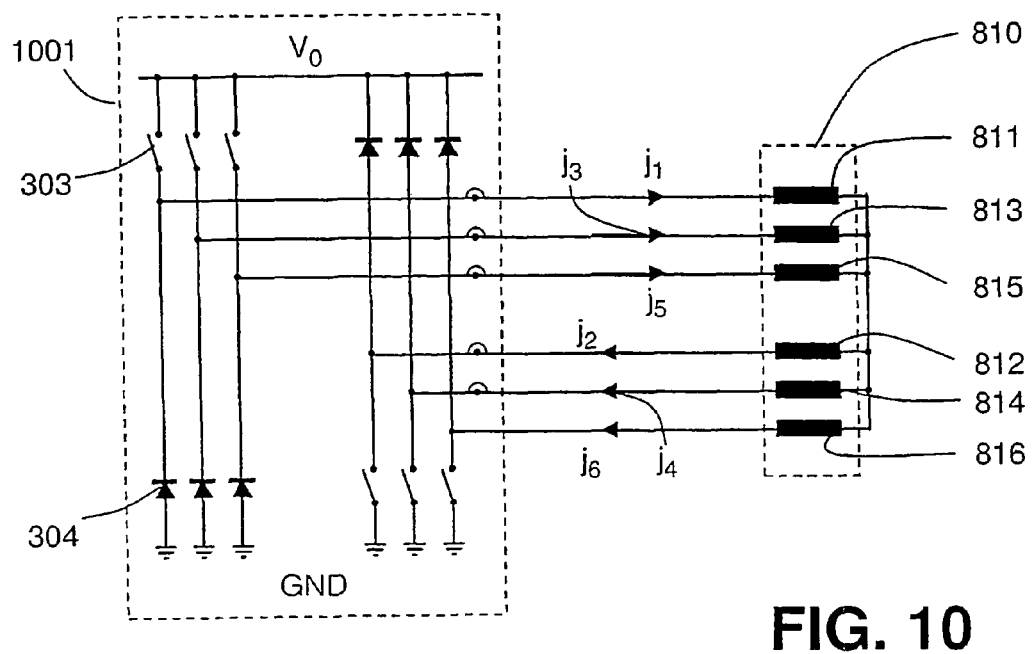
FIG. 10 shows a schematic view of a cabling scheme according to a third embodiment of the present invention, for connecting an amplifier unit to a bearing unit with six actuators.

The invention can be applied to other actuator arrangements than those described above. As another example, FIG. 8 shows, in a highly schematic manner, a radial bearing unit 810 with six actuators 811, 812, 813, 814, 815, and 816. In a wiring scheme according to the prior art, these actuators would, e.g., be connected to an amplifier unit 901 through a common return wire as shown in FIG. 9. In this scheme, again, the return wire must have a much increased current rating compared to the other wires. In contrast, FIG. 10 shows a schematic wiring of the bearing unit 810 connected to an amplifier unit 1001 according to the present invention. Three actuators 811, 813, 815 forming a first subgroup are connected to a first common node with a first polarity, while actuators 812, 814 and 816 forming a second subgroup are connected to a second common node with a second polarity opposite to the first polarity. The nodes are again directly connected and can be viewed as a single common node. The currents through the actuators fulfill the node condition $j_1+j_3+j_5=j_2+j_4+j_6$. This condition can easily be satisfied because the number of actuators or currents exceeds the number of degrees of freedom to be controlled.

The same control scheme as in FIG. 10 may also be applied if the first subgroup of actuators 811, 813 and 815 forms a first (e.g., upper) radial bearing unit with three actuators, and the second subgroup of actuators 812, 814 and 816 forms a second (e.g., lower) radial bearing unit with three actuators. Still, full control of the four radial degrees of freedom (two translational, two rotational/tilting) can be achieved: There are six control variables (currents), four degrees of freedom and two boundary conditions: a given bias current (or, equivalently, a given sum of the three currents in each group), and the node condition $j_1+j_2+j_3=j_4+j_5+j_6$. These conditions can be fulfilled simultaneously.

Figure 11:
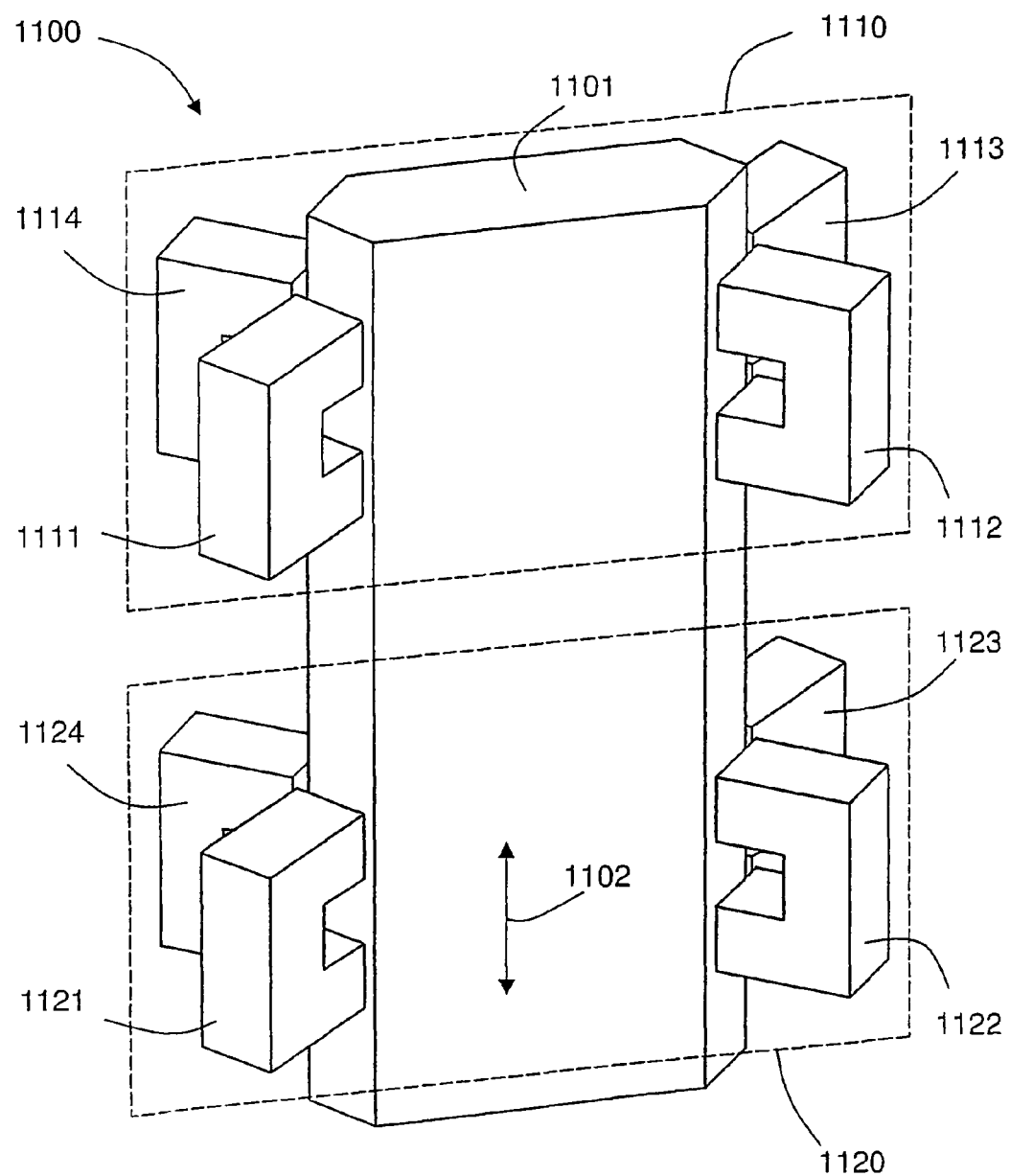
FIG. 11 shows a highly schematic perspective view of a linear magnetic bearing device with eight actuators.
Figure 12:
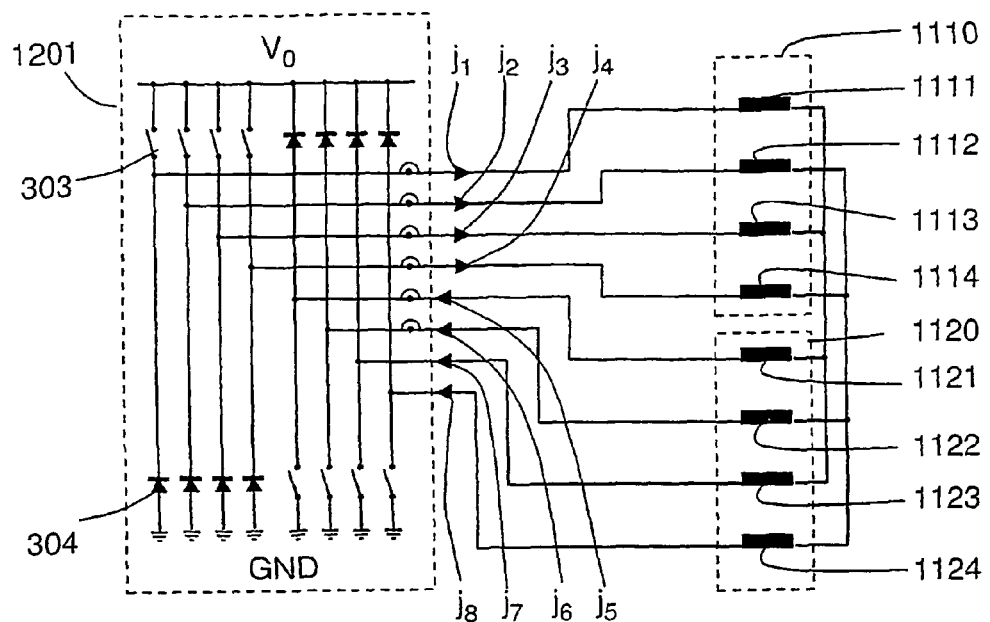
FIG. 12 shows a schematic view of a cabling scheme according to a fourth embodiment of the present invention, for connecting an amplifier unit to the actuators of FIG. 11.
Figure 13:
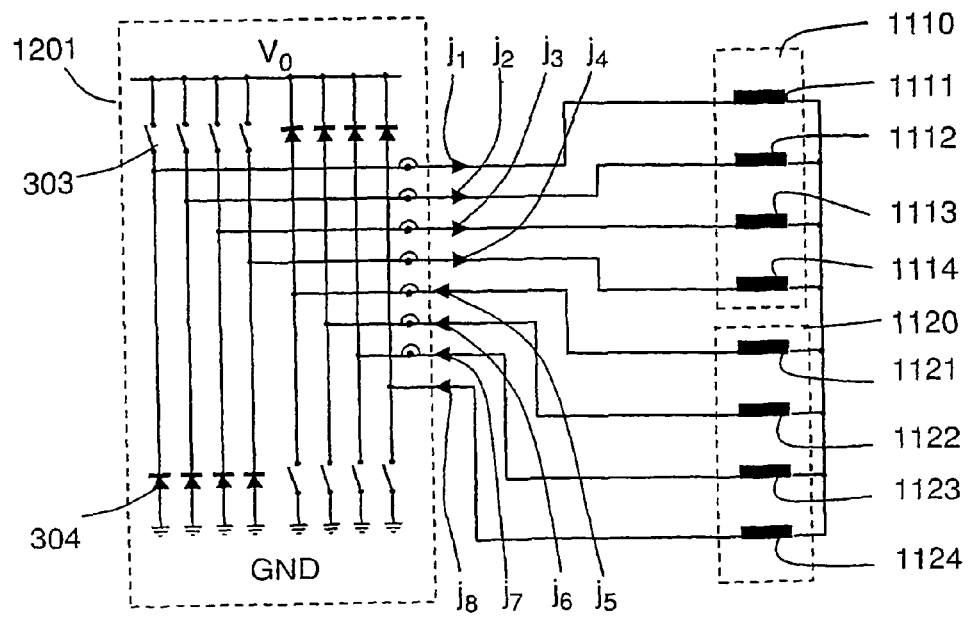
FIG. 13 shows a schematic view of a cabling scheme according to a fifth embodiment of the present invention, for connecting an amplifier unit to the actuators of FIG. 11.
Figure 14:
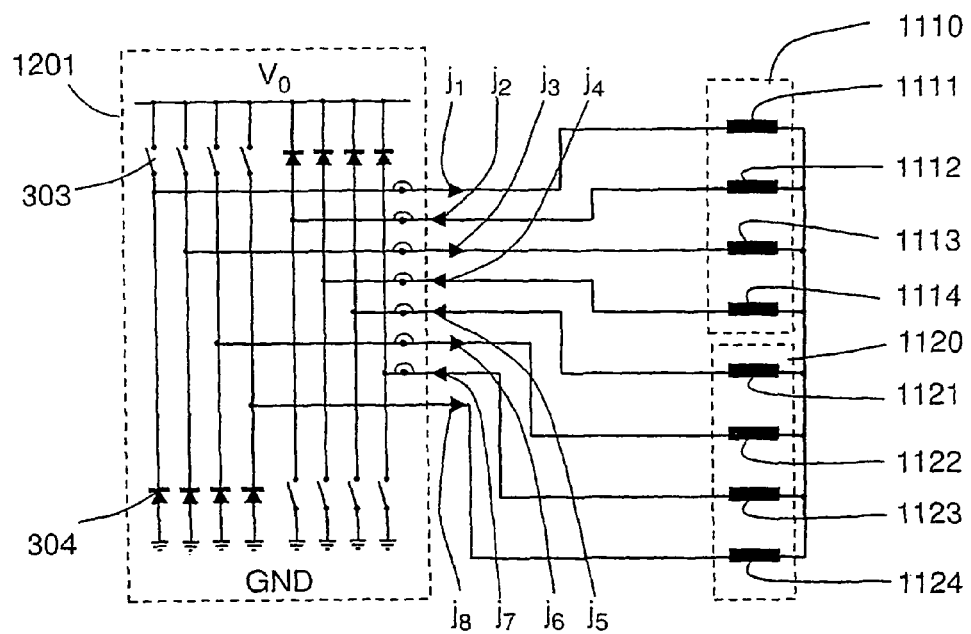
FIG. 14 shows a schematic view of a cabling scheme according to a sixth embodiment of the present invention, for connecting an amplifier unit to the actuators of FIG. 11.

As still another example, FIG. 11 shows a linear bearing device 1100 in a highly schematic manner. An object 1101 is supported by an upper bearing unit 1110 and a lower bearing unit 1120 for linear movement along the z direction as indicated by arrow 1102. The upper bearing unit 1110 comprises four actuators 1111, 1112, 1113, and 1114, and the lower bearing unit 1120 comprises another four actuators 1121, 1122, 1123 and 1124. For simplicity, the windings of the electromagnetic actuators have not been drawn in FIG. 11. Five degrees of freedom are to be controlled: translations in directions perpendicular to the z direction (x and y), and rotations (tilting motions) in three directions. FIGS. 12, 13 and 14 show three different possible wiring schemes according to the present invention for such a linear bearing device. In FIG. 12, two groups of four actuators each are formed. The first group comprises two subgroups: a first subgroup of actuators 1111 and 1113 for controlling displacements in the ±x direction in the first bearing unit, connected to the amplifier unit 1201 with positive polarity, and a second subgroup of actuators 1121 and 1123 for controlling displacements in the ±x direction in the second bearing unit, connected to the amplifier unit 1201 with negative polarity. The two subgroups are connected at a common node. The currents within the subgroup fulfill the relation $j_1+j_3=j_5+j_7$ because of the presence of the common node. Likewise, the second group comprises a first subgroup of actuators 1112 and 1114 and a second subgroup of actuators 1122 and 1124 connected through a common node in the same fashion as the first group. The currents within the second subgroup fulfill the relation $j_2+j_4=j_6+j_8$ This places two constraints (boundary conditions) on the currents. As there are five degrees of freedom to be controlled and eight actuators, one additional boundary condition can be appropriately chosen, e.g. for setting a (constant or dynamically adaptable) bias current.

In FIG. 13, all actuators in both bearing units form a single group. The actuators 1111, 1112, 1113 and 1114 of the upper bearing unit form a first subgroup connected to the amplifier unit 1201 with positive polarity, while the actuators 1121, 1122, 1123 and 1124 of the lower bearing unit form a second subgroup connected to the amplifier unit 1201 with negative polarity. The two subgroups are connected at a common node, resulting in the condition $j_1+j_2+j_3+j_4=j_5+j_6+j_7+j_8$. Two more constraints can be appropriately chosen, e.g., for setting a (constant or dynamically adaptable) bias current.

Also in FIG. 14, all actuators form a single group. Actuators 1111, 1113, 1122 and 1124 form a first subgroup (positive polarity), actuators 1112, 1114, 1121 and 1123 form a second subgroup (negative polarity). The presence of a common node between the subgroups results in $j_1+j_3+j_6+j_8=j_2+j_4+j_5+j_7$. Two more constraints can again be freely chosen.

Figure 15:
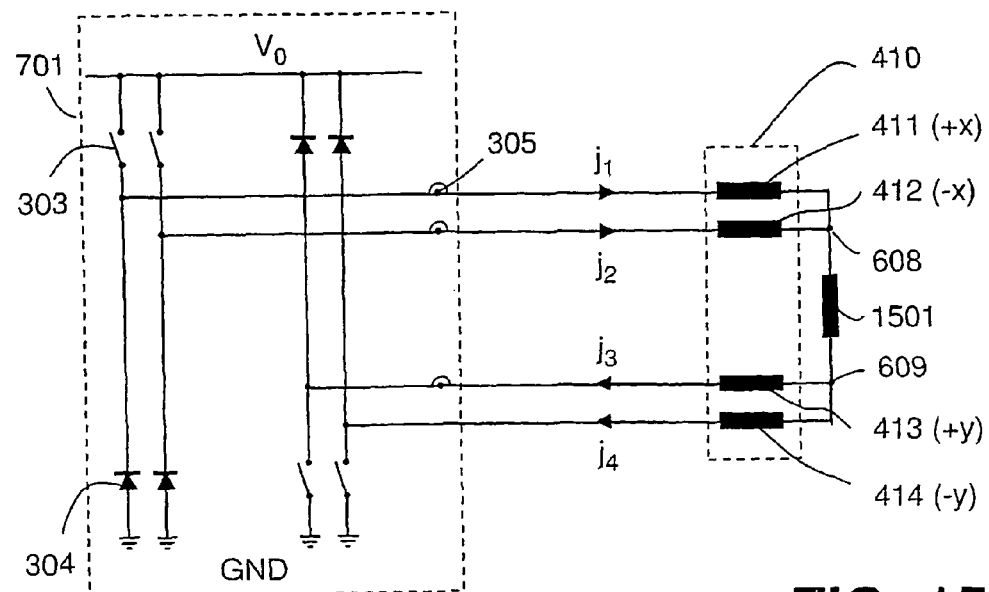
FIG. 15 shows a schematic view of a cabling scheme according to a seventh embodiment of the present invention, for connecting an amplifier unit to a bearing unit with four actuators.

FIG. 15 illustrates that, quite generally, the first and the second common node need not be connected directly. In other words, they need not form a single common node. In this example, the same arrangement as in FIG. 7 has been chosen. However, in contrast to FIG. 7, an additional actuator 1501 is connected between the first and the second common node. The current through this additional actuator is the sum of the currents through the pair of actuators 411 and 412 or, equivalently, through the pair of actuators 413 and 414. The actuator 1501 can thus be controlled by changing this sum, i.e., by changing the bias current $j_B$.

Figure 16:
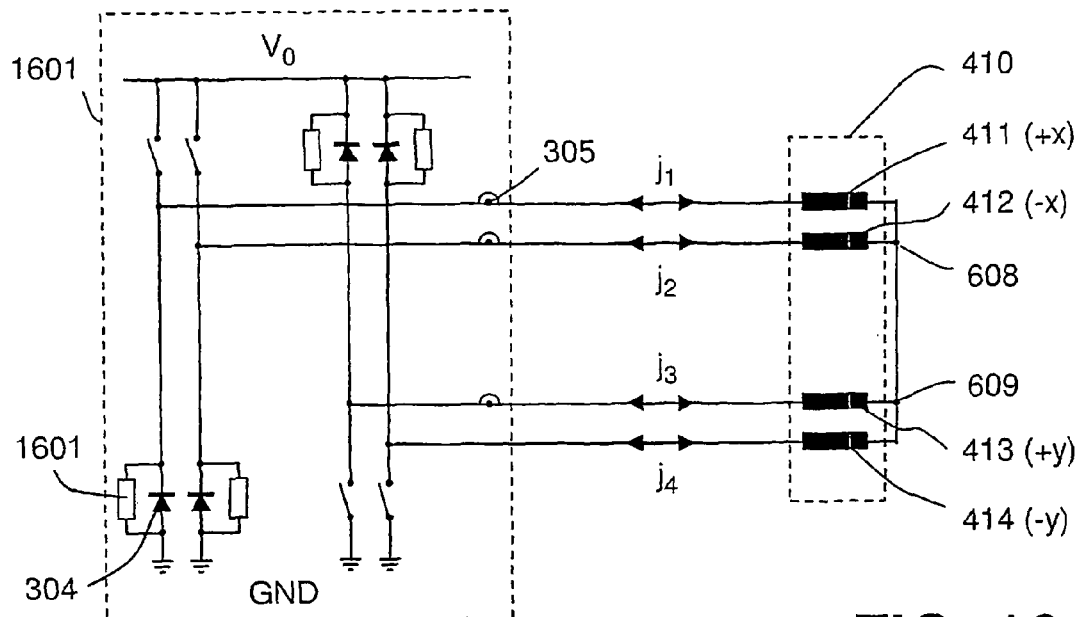
FIG. 16 shows a schematic view of a cabling scheme according to a eighth embodiment of the present invention, for connecting an amplifier unit to a bearing unit with four actuators.

In the above examples, it has been assumed that each actuator is connected to the amplifier unit with a fixed polarity, i.e., that only currents in a specific direction can flow through each actuator. This has been ensured by an appropriate design of the amplifier unit, specifically, by diodes 304. However, it is within the scope of the present invention that currents in individual actuators may flow in different directions within each subgroup of actuators, at least at some points in time. This is illustrated in FIG. 16. Here, a resistor 1601 is provided in parallel to each diode 304. Each resistor enables a small current to flow in the blocking direction of each diode.

Figure 17:
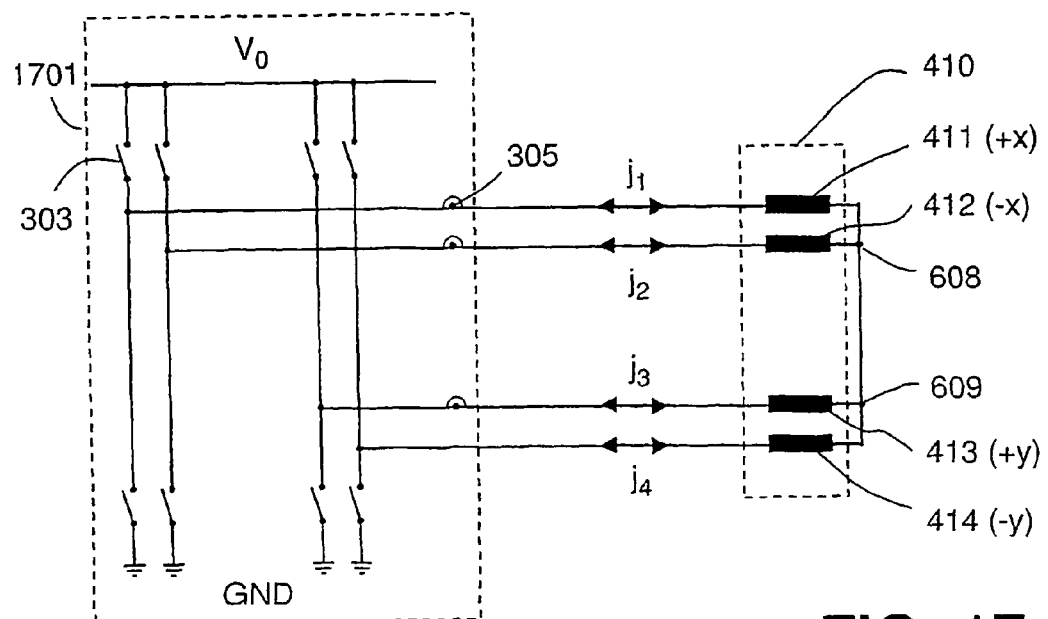
FIG. 17 shows a schematic view of a cabling scheme according to a ninth embodiment of the present invention, for connecting an amplifier unit to a bearing unit with four actuators.

Instead of providing diodes, it is possible to provide additional active switches, as illustrated in FIG. 17. By controlling the switches appropriately, it is possible to achieve any desired current in any desired direction in each of the actuators, while the node condition is automatically fulfilled. Control is achieved by an appropriately programmed controller.

In both the embodiments of FIGS. 16 and 17, it is always possible to drive the amplifier unit in such a way that certain additional boundary conditions are fulfilled, e.g., that the current between the two common nodes 608 and 609 always flows in a predetermined direction.

If a common return wire between either node 608 or 609 and the amplifier unit were present (together with appropriate amplifier components for controlling the current through this return wire), a controller with an appropriate control program would ensure that the current through the common return wire does not exceed a predetermined maximum value. Again, the control program may also ensure that other boundary conditions are met.

Figure 19:
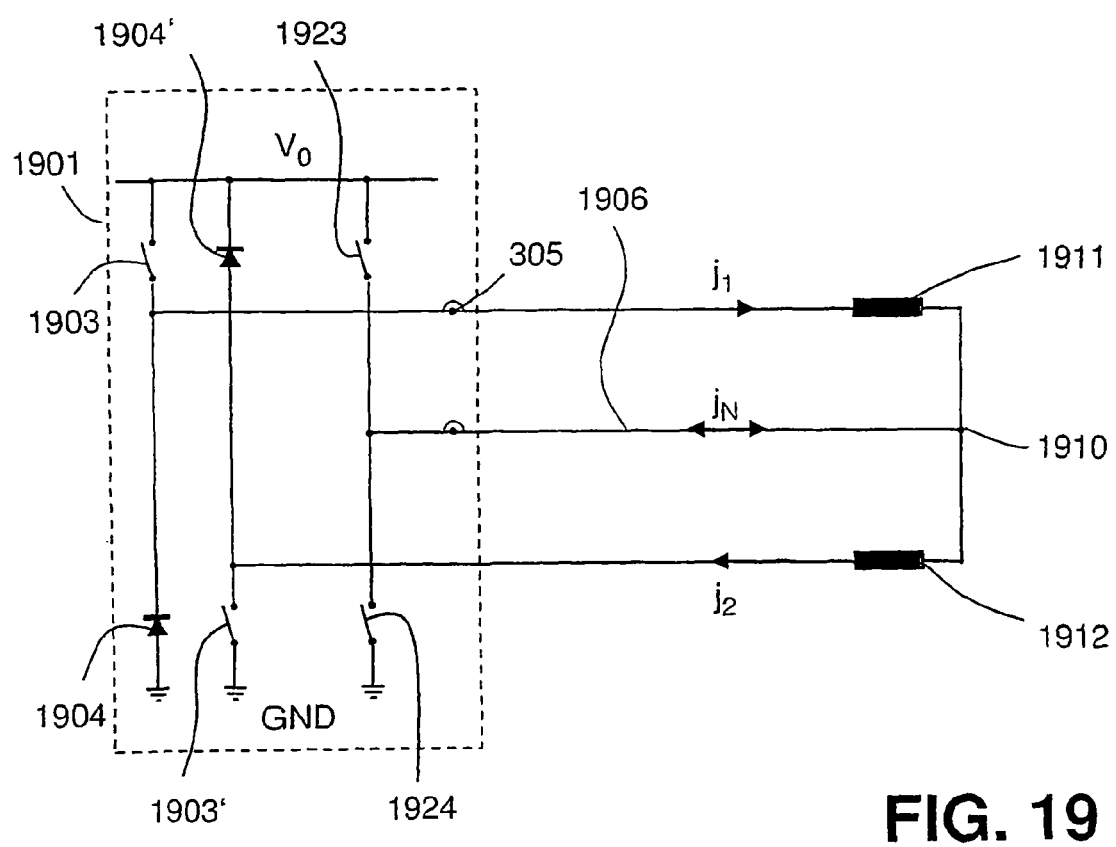
FIG. 19 shows a schematic view of a cabling scheme according to an eleventh embodiment of the present invention.

FIG. 19 shows a wiring scheme according to a second aspect of the present invention. Two actuators 1911, 1912 and an amplifier unit 1901 are provided. Normally, the actuators will be any pair of actuators in a magnetic bearing device disposed on opposite sides of an object to be suspended by the magnetic bearing device. By the way of example, the actuators may be a pair of actuators of an axial bearing unit such as actuators 131, 132 in unit 130 of the device of FIG. 1, or any pair of opposing actuators in a radial bearing unit. The two actuators are connected in a series configuration between the two outputs of an amplifier circuit of a unipolar H-bridge type. The connection point between the two actuators (common node 1910) is connected to a circuit in the amplifier unit which acts to alternatively connect the common node to either a supply voltage $V_0$ or to ground GND.

The H-bridge circuit comprises two branches. The first branch comprises a first current switch 1903 and a first diode 1904 connected in series between the (positive) voltage $V_0$ and ground GND. The diode is inserted reverse to its conducting direction. In a second branch, a second diode 1904' and a second current switch 1903' are connected in series, in a similar manner, but in opposite order. Each connection point between a diode and a current switch is connected to a port of an actuator 1911 or 1912, respectively.

For establishing a predetermined bias current $j_B$ through both actuators 1911, 1912, both switches 1903, 1903' are closed. The actuators act as a large inductance, i.e., a current will gradually build up in the actuators. Once the desired bias current $j_1=j_2=j_B$ is reached, one of the switches 1903 or 1903' is opened. The current now recirculates in a closed loop through the actuators, the closed switch in the one branch and the diode of the other branch. Through inevitable losses (e.g., ohmic losses of the actuators) and the forward voltage of the diode, the current through the actuators will slowly diminish. Therefore, for maintaining the bias current, it will be necessary to close the open switch from time to time. If the bias current is to be reduced, both switches are opened, and current will circulate through the actuators and the diodes against the action of the voltage $V_0$, which now acts to reduce the current in the actuators. The current, however, will always flow in the same direction, as indicated by the arrows in FIG. 19, and will never reverse its direction as a consequence of the circuit design (possibly apart from negligible leakage currents).

Of course, any known scheme for controlling the sequence of opening and closing of the switches may be applied, without leaving the general spirit of the described scheme. In particular, standard PWM schemes may be employed for controlling the bias current (see, e.g., Zhang, J.; Schulze, J. O.; Barletta, N: Synchronous Three-Level PWM Power Amplifier for Active Magnetic Bearings. Proceedings of the 5th International Symposium on Magnetic Bearings, Kanazawa 1996, pp. 277-282).

In an alternative embodiment, the diodes may be replaced by active switches. Then, of course, active control of all switches is necessary in order to avoid undesired short-circuiting between the voltages $V_0$ and GND and in order to control the bias current in the same spirit as described above, and a control unit is provided to achieve this active control. Control may be implemented in hardware or software.

For controlling the position of an object suspended magnetically by the magnetic bearing device, the current $j_1$ through actuator 1911 can be made different from the current $j_2$ through actuator 1912. To this end, a control current (node current) $j_N$ is provided to the common node 1910 through connection 1906. For increasing the control current, switch 1923 is closed, while for decreasing the control current, switch 1924 is closed. Of course, never will both switches be closed at the same time, in order to avoid short-circuiting of the supply voltage $V_0$ to ground. Again, a suitable control unit will be provided to ensure this. Control may again be implemented in hardware or software. Of course, also the bias current may be changed while the control current is changed.

A prominent advantage of such a magnetic bearing device is the capability of rapid control. While changes in bias current are relatively slow, as the maximum voltage $V_0$ acts across the sum of the inductances of both actuators when changing the bias current, changes in control current can be achieved more rapidly, since the maximum voltage $V_0$ acts across only a single inductance when the control current is to be changed.

Other advantages over a traditional wiring scheme, in which each actuator would be connected to an independent unipolar H-bridge circuit, include the following:

Only two instead of four diodes are needed for the complete circuit.

Only three connections instead of four are needed between the actuators and the amplifier unit.

Each actuator can be driven in the full-range between negative voltage $-V_0$ and the positive voltage $V_0$.

The ratio between maximum output power and the number and power rating of required active switches is favorable.

The ratio between maximum output power and current rating of the connection cables is favorable.

Although this wiring scheme needs a connection to the common node, it can be the most advantageous configuration in some applications.

As described in connection with the circuit of FIG. 3, a variety of different active current switching means may be used, e.g., transistors (e.g., MOSFET, IGBT etc.), thyristors and others.

The described circuit may be used for driving any desired pair of actuators for controlling one degree of freedom of an object suspended in a magnetic bearing device. In particular, in a magnetic bearing device for suspending a rotor, such a circuit may be used for the axial bearing (+z, -z actuators) or for any of the radial bearings (e.g., upper or lower +x, -x actuators or upper or lower +y, -y actuators, respectively). If the circuit is used for all bearings in such a device, five circuits would be needed for full active control of five degrees of freedom, with a total of twenty active switches, ten diodes and fifteen connection wires between amplifier unit and bearings. This enables significant savings over a traditional wiring scheme.

From the foregoing examples, it is apparent that a plurality of possibilities exist for wiring a group of actuators according to the present invention. In the following, the wiring schemes shall be described in a general mathematical framework. This framework is applicable in all cases in which the actuators are connected to the amplifier unit with fixed polarities.

It is assumed that a group of n actuators is used for controlling m degrees of freedom. Translational degrees of freedom are controlled by forces, rotational degrees of freedom by torques generated by the actuators. It is assumed that n>m. It may further be assumed without loss of generality that there is a linear relationship between currents and forces and/or torques generated by the actuators:

$$\vec{F} = \underline{D} \cdot \vec{J},$$

where $$\vec{F} = (f_1, \ldots, f_m)^T$$

is a m-component column vector of m force and/or torque values, each force and/or torque acting to control one predetermined degree of freedom, $$\vec{J} = (j_1, \ldots, j_n)^T$$

is a n-component column vector of n current values for the n actuators, and D is a (m×n) matrix with m rows and n columns whose components depend on the geometric arrangement and physical characteristics of the actuators. This matrix may be called a "geometry matrix". The symbol T indicates matrix transposition. If a linear relationship does not exist as postulated, then the true (non-linear) relationship can always be linearly approximated in the vicinity of a predetermined operating point, e.g., by a Taylor expansion. The current values then should be understood as values for (small) current changes.

In order that all forces and/or torques can be controlled independently, rank (D) must be equal to m (i.e., all m rows of D must be linearly independent).

The operating point is usually defined by bias currents. A bias current is defined as some current value which derives from the currents through the actuators and which is to be kept at a defined value. It may be desirable to have different bias currents for different sets of actuators, and the bias currents may vary in time. Each bias current requirement adds constraint on a set of current values (a boundary condition). For k bias current requirements (k≦n−m), these boundary conditions can be described by the equation $\vec{I}_{bias} = \underline{D}_b \cdot \vec{J}.$ Here, $\vec{I}_{bias}$ is a k-component column vector, and $D_b$ is a (k×n) matrix with k rows and n columns describing the relationship between the bias currents and the individual current values. This matrix may be called a "bias matrix". As an example, if the bias current is the sum of all currents through all actuators, then $\underline{D}_b = (1, \ldots, 1)$, i.e., a n-component row vector of ones.

In the case where a linear approximation has been applied and where the currents should actually be understood as (small) current changes, $\vec{I}_{bias}$ should accordingly be understood as a vector of bias current changes. If the bias current is constant in time, the vector $\vec{I}_{bias}$ then contains only zeros, signifying that the sum of current changes through predetermined sets of actuators is zero.

The force equation and the bias current requirement can be written in a single equation:

$$\begin{pmatrix} \vec{F} \\ \vec{I}_{bias} \end{pmatrix} = \underline{D}_x \cdot \vec{J}.$$

Here, $\underline{D}_x = \left( \underline{D}^T, \underline{D}_b^T \right)^T$ is a matrix with m+k rows and n columns. The rank of $D_x$ must be m+k, otherwise it is not possible to operate the system with predetermined bias currents.

As an example, the radial bearing unit 410 of FIGS. 4 to 7 with n=4 actuators and m=2 degrees of freedom (x and y displacements) may be considered. The equations may read as follows:

$\vec{F} = \begin{pmatrix} f_x \\ f_y \end{pmatrix},$ $\vec{J} = (j_{+x} \; j_{+y} \; j_{-x} \; j_{-y})^T,$ $\underline{D} = \begin{pmatrix} 1 & 0 & -1 & 0 \\ 0 & 1 & 0 & -1 \end{pmatrix},$ and $\underline{D}_b = (1 \; 1 \; 1 \; 1).$ The definition of D means that the force in the +x direction is proportional to the current in the +x actuator and to the negative of the current in the −x actuator, and accordingly for the force in the +y direction. The definition of $D_b$ means that the sum of all currents is given thus defining one bias current requirement. It can easily be verified that $D_x$ formed by the matrices D and $D_b$ has a rank of three, as required for independent control of two degrees of freedom with one given bias current.

In the present example, $D_x$ is not quadratic (n>m+k). In this case, more conditions may be added to define a unique relationship between $\vec{F}$ and $\vec{J}$, i.e., for making $D_x$ quadratic and invertible. Then for any desired set of forces and/or torques, the matrix $D_x$ may be inverted for deriving a unique set of currents. In a traditional approach (FIGS. 4, 5), boundary conditions may be added to this end by defining more bias current requirements. For the above example, the bias current requirements may read, for example:

$\underline{D}_b = \begin{pmatrix} 1 & 0 & 1 & 0 \\ 0 & 1 & 0 & 1 \end{pmatrix},$ $\vec{I}_{bias} = \begin{pmatrix} I_{bias,x} \\ I_{bias,y} \end{pmatrix}.$ meaning that the sum of currents through the +x and −x actuators is given independent of the sum of currents through the +y and −y actuators. Therefore, $\underline{D}_x = \begin{pmatrix} 1 & 0 & -1 & 0 \\ 0 & 1 & 0 & -1 \\ 1 & 0 & 1 & 0 \\ 0 & 1 & 0 & 1 \end{pmatrix}.$ It can easily be verified that this matrix has a rank of four and therefore is invertible.

In the inventive method, groups of actuators are connected together at common nodes. The sum of the signed values of currents flowing between the actuators of each group and the associated common node gives the current flowing through the connection between the common node and the amplifier unit, if such a connection is present. Otherwise, this sum is zero. This adds another boundary condition. The requirements for the currents flowing through the common nodes can be expressed as an equation:

$\vec{I}_N = \underline{D}_N \cdot \vec{J}.$

Here, $\vec{I}_N$ is a column vector of p values of currents flowing from each common node to the amplifier unit through the corresponding connection, and p is the number of groups with a common node. If no connections are present, this column vector contains only zeros. $D_N$ is a matrix with p rows (representing common nodes) and n columns (representing actuators) containing only numbers 0, +1 and −1, which describe the way in which the actuators are connected to the common nodes. This matrix may be called a "node matrix". A matrix element of +1 in a given row and column corresponds to the actuator of the given column being connected to the common node of the given row with positive polarity, a value of −1 corresponds to the actuator being connected to the common node with negative polarity, and a value of zero means that no connection of the actuator to the common node is present. In order to have an electrically possible wiring scheme of p separate groups of actuators with one common node each, each column of the matrix $D_N$ may at the most contain one element equal 1 and at most one element equal −1. If there is both an element 1 and an element −1 in the same column, this signifies that an actuator is connected between two common nodes instead of having a direct connection to an amplifier unit. In the context of this document, such an actuator is to be understood as belonging to neither group.

Figure 18:
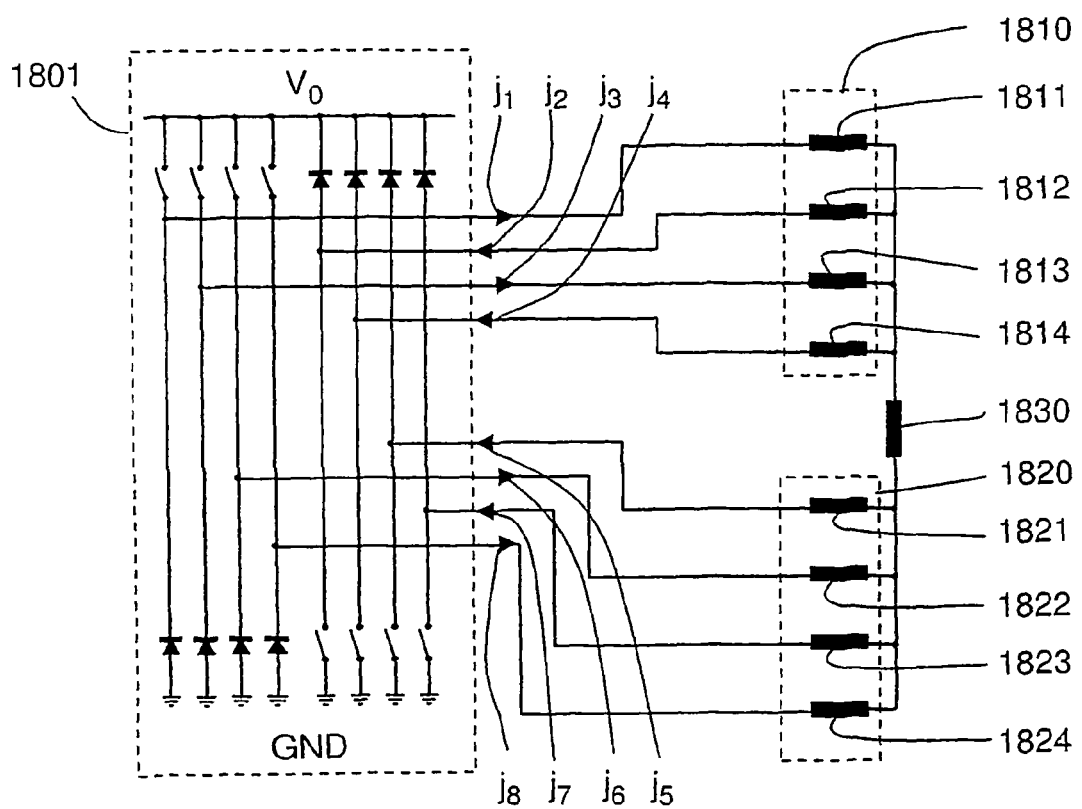
FIG. 18 shows a schematic view of a cabling scheme according to a tenth embodiment of the present invention.

An example for such a situation is shown in FIG. 18. A first group 1810 comprises four actuators 1811, 1812, 1813 and 1814. These could, e.g., be the +x, +y, −x and −y actuators of the upper bearing unit 110 of FIG. 1. Actuators 1811 and 1813 form a first subgroup connected with positive polarity, actuators 1812 and 1814 form a second subgroup connected with negative polarity, and both subgroups are connected to the same common node. The common node of this group of actuators corresponds to a first row in the matrix $\underline{D}_N$, each actuator of the first subgroup contributing an element with value +1 and each actuators of the second subgroup contributing an element with value −1. Likewise, a second group 1820 comprises four actuators 1821, 1822, 1823 and 1824 in two subgroups with opposite polarities, which could be the +x, +y, −x and −y actuators of a lower bearing unit. The common node of this group corresponds to a second row in $\underline{D}_N$. Connected between the common nodes of these groups is an additional actuator 1830. This could, e.g., be an actuator for generating forces in the z direction. This actuator gives rise to an element +1 in the first row and an element −1 in the second row. Altogether, the node matrix therefore is a matrix with two rows and nine columns.

In the case where a linear approximation has been applied and where the currents should actually be understood as (small) current changes, $\bar{I}_N$ should accordingly be understood as a vector of changes of the currents flowing from the common nodes to the amplifier unit.

This equation may be included into the equation for the force-current relationship and the bias requirements:

$$\begin{pmatrix} \bar{F} \\ \bar{I}_{bias} \\ \bar{I}_N \end{pmatrix} = \underline{D}_t \cdot \vec{J}.$$

where $$\underline{D}_t = \begin{pmatrix} \underline{D} \\ \underline{D}_b \\ \underline{D}_N \end{pmatrix}$$

is a matrix with (m+k+p) rows and n columns. This matrix may be called the "system matrix".

In order to make $\underline{D}_t$ invertible, the matrix must be quadratic, i.e., the sum of the number of degrees of freedom to be controlled, of the number of bias current requirements, and of the number of node points must be equal to the number of actuators. Furthermore, the rank of the matrix must be equal to n, i.e., all rows and columns must be linearly independent. Then the matrix can be inverted to yield an inverse system matrix $\underline{D}_t^{-1}$, and a unique set of current values may be computed for each arbitrary set of desired forces and/or torques:

$$\vec{J} = \underline{D}_t^{-1} \cdot \begin{pmatrix} \bar{F} \\ \bar{I}_{bias} \\ \bar{I}_N \end{pmatrix}.$$

In the example of FIG. 6, the numbers are n=4, m=2, k=1 and p=1. The equations read:

$$\bar{F} = \begin{pmatrix} f_x \\ f_y \end{pmatrix},$$

$$\bar{I}_{bias} = j_B = I_{bias,x} + I_{bias,y},$$

$$\bar{I} = j_N = I_{bias,x} - I_{bias,y},$$

$$\bar{J} = (j_{+x} \ j_{+y} \ j_{-x} \ j_{-y})^T,$$

$$\underline{D} = \begin{pmatrix} 1 & 0 & -1 & 0 \\ 0 & 1 & 0 & -1 \end{pmatrix},$$

$$\underline{D}_b = (1\ 1\ 1\ 1), \text{ and}$$

$$\underline{D}_N = (1\ -1\ 1\ -1).$$

The current $j_N$ is the current through the common return 606, flowing from the common node 610 to the amplifier unit. This current may have an arbitrary fixed value. If $j_N=0$, the common return can be left away, as in FIG. 7. Therefore, FIG. 7 is correctly described by the above equations with $j_N=0$. The matrix (actually, row vector) $\underline{D}_N$ means that all four actuators of the radial bearing unit form a single group which is connected at a single common node. The +x and −x actuators are connected with positive polarity, the +y and −y actuators with negative polarity. With this choice, the matrix $\underline{D}_t$ may be inverted to compute, for arbitrary required forces, the current values for the actuators.

If the bias condition is left away, more freedom of connecting the actuators via common nodes exists. Specifically, one choice would be $$\underline{D}_N = (1\ 1\ 1\ 1),$$

corresponding to the prior-art solution of FIG. 5 and still leaving freedom for one additional boundary condition. Another choice would be $$\underline{D}_N = \begin{pmatrix} 1 & 0 & -1 & 0 \\ 0 & 1 & 0 & -1 \end{pmatrix},$$

corresponding to a prior-art solution in which +x and −x actuators as well as +y and −y actuators are connected pairwise in series with opposite polarity, without the possibility of supplying a bias current. This shows that the present mathematical treatment is quite generally applicable for many different actuator topologies.

It is possible to evaluate all possible matrices $\underline{D}_N$ for given numbers of actuators (n) and degrees of freedom (m) with low computational effort, because $\underline{D}_N$ contains only numbers 0, 1 or −1, and because any column may only contain one number 1 and/or −1. This leads to a very limited number of possible matrices.

As an example, a systematic search has been applied to the linear bearing system with n=8, m=5 of FIGS. 11 to 14, with the additional condition that at least one bias current requirement should be fulfilled (k≧1). Three reasonable and technically sensible connection schemes resulting from this search are the schemes of FIGS. 12 to 14, corresponding to $$\underline{D}_N = \begin{pmatrix} 0 & 1 & 0 & 1 & 0 & -1 & 0 & -1 \\ 1 & 0 & 1 & 0 & -1 & 0 & -1 & 0 \end{pmatrix}$$

for FIG. 12, $$\underline{D}_N = (1\ 1\ 1\ 1\ -1\ -1\ -1\ -1)$$

for FIG. 13, and $$\underline{D}_N = (1\ -1\ 1\ -1\ 1\ -1\ 1\ -1)$$

for FIG. 14.

In the last two schemes, p=1, and one additional boundary condition can still be chosen freely.

As another example, the corresponding equations for the embodiment of FIG. 19, i.e., a single pair of magnets connected in series and having a common node to which a control current is supplied, are derived. The force direction of the first magnet is opposite to the force direction of the second magnet:

$$\underline{\underline{D}} = (1\ -1)$$

A bias condition may be added:

$$\underline{\underline{D}}_b = (1\ 1).$$

Now $\underline{\underline{D}}_x = (\underline{\underline{D}}^T, \underline{\underline{D}}_b^T)^T$ is quadratic. The current on the common node $j_N$ can be calculated based on the desired force without the need of an additional boundary condition $\underline{\underline{D}}_N$. Therefore the common node needs a connection to the amplifier which has to control $j_N$, as in FIG. 19.

The above general mathematical model assumed a linear relationship between currents $\overline{J}$ and desired forces/torques $\overline{F}$, or at least a linear approximation of such a linear relationship. As already mentioned, such a linear approximation can always be established in a small region around a predetermined operating point by replacing the "true" current-force relationship by a linear approximation, as in the well-known Taylor expansion. The current values should then be understood as values of (small) current changes. In a more general approach, the current values may be understood as generalized force values. Each generalized force value represents the desired force to be generated by an individual actuator. If the physical characteristics of the actuator are known, the generalized force value can be transformed into the real current in the actuator required for generating this force. Additional system state information may be used for this purpose (e.g. rotor position). The computation of currents from generalized force values can be achieved, e.g., by employing a lookup table for each actuator which reflects the physical characteristics of each actuator. This can be done independently for each actuator. The relationship between generalized force values and currents need not be linear. In the course of the control, generalized force values will be computed that fulfill the (linear) equations of the above mathematical model. Specifically, the conditions about currents through the common nodes, as described by the matrix $\underline{\underline{D}}_N$ and the vector $\overline{I}_N$, will now be conditions about generalized force values. The generalized force values will be transformed into driving currents of the actuators through a generally nonlinear relationship. To make sure that the computed currents still fulfill the conditions for the common nodes, a transformed matrix $\tilde{\underline{\underline{D}}}_N$ may be used instead of the original $\underline{\underline{D}}_N$, which expresses the conditions for currents at the common nodes as conditions which must be fulfilled by the generalized force values. The matrix $\tilde{\underline{\underline{D}}}_N$ can be easily calculated if the current-force relation is linearly approximated around the working point. If necessary, $\tilde{\underline{\underline{D}}}_N$ may be recalculated at each sampling time to the actual working point of the actuator. In practical applications simplifications of this method usually yield satisfying results. If $\tilde{\underline{\underline{D}}}_N$ is kept constant, or if the original matrix $\underline{\underline{D}}_N$ is used, the computed currents might not fulfill the conditions for the common nodes any more. However, through Kirchhoff's first law, these conditions are fulfilled a priori. This forces the amplifiers to yield real currents different from the computed currents in a way that the node conditions (Kirchhoff's first law) are again fulfilled.

Alternatively the nonlinearity can be compensated by additional means added before the transformation with the inverse system matrix $D_t^{-1}$. If the physical characteristics of the actuator are known, a modified force/torque value can be computed for the transformation based on the original desired force/torque $\overline{F}$ values, in order to get the current in the actuator compensated for the nonlinearities.

Such a computation can be achieved, e.g., by employing a lookup table which reflects the physical characteristics of each actuator and uses system state information (e.g. bias current, rotor position, sensor information) in order to compensate for the nonlinearities of the actuators.

Another freedom in computing suitable currents is to change bias currents dynamically in order to optimize system performance like conducting losses or linearity.

Any control scheme employed in connection with the present invention can be implemented in software or in hardware. Specifically, it is advantageous if a digital signal processor (DSP) is employed for any calculations required for achieving control. Such a DSP may be understood as being part of the amplifier unit. The appropriately programmed DSP is then understood as a means for controlling the currents in the actuators. Calculations may include evaluation of any sensor signals after appropriate digitization by an analog-to-digital converter (ADC), calculation of the required forces/torques (or generally, control signals) for these sensor signals within a control step, calculation of the appropriate generalized force values, and transformation of generalized force values into current values, which are provided to the power amplifiers and actuators, e.g., through a digital-to-analog converter (DAC) or a pulse width modulator (PWM). In more general terms, the calculations may include any computational step in the process of deriving generalized force values from sensor signals (from the displacement sensors or equivalent sensor information).

Specifically, the control step may advantageously involve deriving control signals from sensor signals according to a proportional (P), proportional-integral (PI), proportional-integral-differential (PID), proportional-differential (PD) control scheme or more sophisticated control methods like nonlinear control, adaptive control or $H_\infty$ control, as they are well known in the art. In addition, the control step may involve transformations, frequency filtering or any other advantageous measures for achieving stable control.

Even though the invention has been described with reference to preferred embodiments, it is apparent that the invention is by no way limited by these embodiments, and that many variations are possible without leaving the scope of the invention.

As one of many examples, the present invention may also be applied to so-called conical bearings for supporting a rotor, in which at least one actuator exerts a force as well in the axial (z) direction as in a radial direction.

The invention claimed is:

1. A magnetic bearing device for supporting an object magnetically, comprising:
   an amplifier unit, and
   at least one group of electromagnetic actuators for controlling a number of degrees of freedom of the object, where the number of actuators in said group is at least three, each actuator in said group of actuators having a first port and a second port for providing a current to said actuator, the first port of each actuator in said group of actuators being connected to said amplifier unit,
   wherein said group of actuators is divided into a first subgroup and a second subgroup of actuators, the second port of each actuator in the first subgroup being connected to a first common node and the second port of each actuator in the second subgroup being connected to a second common node,
   wherein said first common node and said second common node are electrically connected by a node connection means, and
   wherein said amplifier unit is adapted to control said currents through said actuators in such a way that the sum of currents through each subgroup always flows in the same direction.

2. The magnetic bearing device according to claim 1, wherein there is no additional electrical connection between any of said common nodes and said amplifier unit.

3. The magnetic bearing device according to claim 1, further comprising:
   at least one additional electrical connection between said first and/or said second common node and said amplifier unit, and
   wherein said amplifier unit is adapted to control said currents through said actuators in such a way that the sum of the absolute values of all currents through said additional electrical connections is always lower than the sum of the absolute values of all currents through all actuators in said group of actuators.

4. The magnetic bearing device according to claim 1, wherein said first and second common nodes are directly connected to each other, forming a single common node.

5. The magnetic bearing device according to claim 4, further comprising:
   an electrical connection between the single common node and the amplifier unit, and
   wherein the amplifier unit comprises active switching means operable to selectively connect said single common node to one of a first potential level and a second potential level lower than said first potential level.

6. The magnetic bearing device according to claim 1, wherein said node connection means comprises at least one of a coil and a further electromagnetic actuator.

7. The magnetic bearing device according to claim 1, wherein each actuator of said group of actuators is a reluctance-type actuator.

8. The magnetic bearing device according to claim 1, wherein said first port of each actuator in said first subgroup is connected to said amplifier unit with a first polarity, and
   wherein said first port of each actuator in said second subgroup is connected to said amplifier unit with a second polarity opposite to the first polarity.

9. The magnetic bearing device according to claim 1, wherein said amplifier unit comprises active switching means operable to selectively connect each first port of each said actuator of said first subgroup to a first potential level and to selectively connect each first port of each said actuator of said second subgroup to a second potential level lower than said first potential level.

10. The magnetic bearing device according to claim 9, wherein said amplifier unit comprises a plurality of first diodes enabling unidirectional current flow from said second potential level to each first port of each said actuator in said first subgroup and a plurality of second diodes enabling current flow from each first port of each actuator in said second subgroup to said first potential level.

11. The magnetic bearing device according to claim 1, wherein said group of actuators comprises a first actuator for generating a force in a first direction, a second actuator for generating a force in a second direction opposite to the first direction, a third actuator for generating a force in a third direction different from the first direction and second direction, and a fourth actuator for generating a force in a fourth direction opposite to the third direction, wherein said first subgroup comprises said first actuator and said second actuator, and wherein said second subgroup comprises said third actuator and said fourth actuator.

12. A method of operation of a magnetic bearing device for supporting an object magnetically, said magnetic bearing device comprising an amplifier unit and at least one group of electromagnetic actuators for controlling a number of degrees of freedom of the object, where the number of actuators in said group is at least three, each actuator in said group of actuators having a first and a second port for providing a current to said actuator, the first port of each actuator in said group of actuators being connected to said amplifier unit, said group of actuators being divided into a first subgroup and a second subgroup of actuators, the second port of each actuator in the first subgroup being connected to a first common node and the second port of each actuator in the second subgroup being connected to a second common node, said method comprising:
   electrically connecting said first common node and said second common node by a node connection means, and
   providing currents to said actuators in such a way that the sum of currents through each subgroup always flows in the same direction.

13. The method according to claim 12, wherein no additional electrical connection is provided between said common nodes and said amplifier unit.

14. The method according to claim 12, further comprising:
   providing currents to said actuators in such a way that the sum of the absolute values of all currents through any additional electrical connections between said common nodes and said amplifier unit is zero or always lower than the sum of the absolute values of all currents through all actuators in said group of actuators.

15. The method according to claim 12, wherein said magnetic bearing device comprises a number of p groups of actuators, where $p \geq 1$, with a total of a number of n actuators for controlling a number of m degrees of freedom, the actuators of each group of actuators being connected at a common node, wherein said method further comprises the following steps:
   providing a plurality of sensor signals;
   deriving a set of m control signals based on said sensor signals; and
   deriving, from said control signals, a set of n generalized force values for driving said actuators,
   wherein said step of deriving a set of n generalized force values comprises:
   determining a geometry matrix $\underline{\underline{D}}$ whose matrix elements describe the geometric arrangement and physical characteristics of the actuators;
   determining a node matrix $\underline{\underline{D}}_N$ whose matrix elements describe the connection of the actuators to each said common node;
   determining a bias matrix $\underline{\underline{D}}_b$ whose matrix elements describe additional boundary conditions;
   forming a quadratic, invertible system matrix $\underline{\underline{D}}_t$ from the geometry matrix $\underline{\underline{D}}$, the bias matrix $\underline{\underline{D}}_b$ and the node matrix $\underline{\underline{D}}_N$;
   inverting said system matrix $\underline{\underline{D}}_t$ to obtain an inverse system matrix $\underline{\underline{D}}_t^{-1}$; and
   multiplying said inverse system matrix $\underline{\underline{D}}_t^{-1}$ with a column vector containing the values of said m control signals, p additional numbers describing currents out of said common node or nodes, and a number of (n−m−p) additional numbers belonging to said additional boundary conditions to obtain a column vector with n rows containing said generalized force values.

16. A magnetic bearing device for supporting an object magnetically, comprising:
   an amplifier unit, and
   a pair of electromagnetic actuators disposed on opposite sides of the object to be supported, each said actuator having a first and a second port for providing a current to said actuator,
   wherein said second port of said first actuator and said first port of said second actuator are connected to a common node, no other actuators being connected to said common node,
   wherein each of said first port of said first actuator, said second port of said second actuator and said common node is connected to said amplifier unit, and
   wherein said amplifier unit comprises an H-bridge circuit supplied between a first and a second potential level, wherein said first port of said first actuator is connected to a first branch of said H-bridge circuit, wherein said second port of said second actuator is connected to a second branch of said H-bridge circuit, and wherein said common node is connected to switching means which act to alternatively connect said common node to either said first or said second potential level to allow the common node to substantially assume alternatively the first or the second potential level, and
   wherein said amplifier unit is adapted to control said currents through said actuators in such a way that (1) a non-zero bias current flows from said first port of said first actuator to said second port of said second actuator, and (2) the current through each said first actuator and said second actuator always flows in the same direction without changing the current direction.

17. A method of operation of a magnetic bearing device, structured according to claim 16, comprising the steps of
   providing a predetermined non-zero bias current flowing from said first port of said first actuator to said second port of said second actuator;
   determining a displacement of a portion of said object from a desired position; and
   providing a control current between said amplifier unit and said common node by selectively connecting the common node, in alternating sequence, to a first potential level and to a second potential level lower than the first potential level, to generate a force which acts to restore said desired position, without changing the direction of the current in each of the actuators.

* * * * *